United States Patent
Ide et al.

(10) Patent No.: US 6,771,309 B1
(45) Date of Patent: Aug. 3, 2004

(54) CAMERA CONTROLLER PROVIDING CORRECTION CAPABILITY FOR VARIANCES IN CIRCUITS

(75) Inventors: Masataka Ide, Hachioji (JP); Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/451,065

(22) Filed: Nov. 30, 1999

(30) Foreign Application Priority Data

Dec. 1, 1998 (JP) .......................................... 10-341256

(51) Int. Cl.[7] .............................................. H04N 5/232
(52) U.S. Cl. ............................ 348/211.99; 348/211.2
(58) Field of Search .......................... 348/211.99, 211.2

(56) References Cited

U.S. PATENT DOCUMENTS 5,557,363 A    9/1996  Kunishige et al. .......... 354/402

FOREIGN PATENT DOCUMENTS

JP    6-268524    9/1994
JP    6-347263    12/1994

Primary Examiner—Wendy R. Garber
Assistant Examiner—James M. Hannett
(74) Attorney, Agent, or Firm—Straub & Pokotylo; John C. Pokotylo

(57) ABSTRACT

A camera controller is provided wherein a variance in CMOS analog circuits can be corrected and degradation in characteristics prevented without incurring an increase in cost. In a camera controller, a microcomputer, a measuring circuit for a camera and a characteristic alteration circuit are fabricated on a single semiconductor chip. The microcomputer causes the characteristic alteration circuit to alter characteristics of the measuring circuit. The microcomputer activates the measuring circuit and controls the camera on the basis of a measurement output from the measuring circuit.

43 Claims, 20 Drawing Sheets

CAMERA CONTROLLER PROVIDING CORRECTION CAPABILITY FOR VARIANCES IN CIRCUITS

BACKGROUND OF THE INVENTION

The present invention relates to a camera controller which can be used for a camera using a film, a digital camera, etc.

Various types of camera controllers using CMOS analog circuits for cameral control have been developed in the prior art.

U.S. Pat. No. 5,557,363, for example, discloses a camera controller wherein a microcomputer comprising a CPU and peripheral circuits, and a CMOS analog circuit are formed on a single semiconductor chip by a low-cost, general-purpose CMOS process.

In the camera controller disclosed in U.S. Pat. No. 5,557,363, a remote control reception circuit is fabricated by a CMOS process. As a result, compared to the use of a conventional bipolar process, degradation in characteristics due to a variance in the process is serious. For example, the distance over which a remote control signal of the remote control reception circuit can be sent is shortened, and a problem arises in that a remote control operation can be performed only in a short range.

The problem of degradation in characteristics is faced by not only the remote control reception circuit but also by other analog circuits such as a distance measurement circuit and a light measurement circuit.

To deal with this problem, there is an idea that the gain of the remote control reception circuit, the central frequency $f_0$ of a band-pass filter (BPF), etc. is adjusted.

In a specific method of adjustment, resistance elements, etc. on an IC chip are trimmed by laser trimming.

Alternatively, an external resistor may be provided for an IC chip and, with a proper resistance value of the external resistor chosen, the resistor is connected to the IC chip. Or a variable resistor may be connected and adjusted.

In the case of using the laser trimming method, however, large-scale, high-cost equipment is required. Consequently, the cost of a device, such as a camera, having the remote control reception circuit is increased.

On the other hand, the method of choosing the resistance value of the external resistor or adjusting the variable resistor requires additional adjustment work, resulting in an increase in cost.

BRIEF SUMMARY OF THE INVENTION

The method of the present invention is to provide a camera controller wherein a variance in CMOS analog circuits can be corrected and degradation in characteristics can be prevented, without incurring an increase in manufacturing cost.

According to a first aspect of the invention, there is provided a camera controller comprising:

a microcomputer;

a measuring circuit for a camera, the measuring circuit acquiring information necessary for an operation of the camera and having variable electrical characteristics; and an alteration circuit, controlled by the microcomputer, for altering the electrical characteristics of the measuring circuit for the camera, wherein the microcomputer and the circuits are fabricated on a single semiconductor substrate.

According to a second aspect of the invention, there is provided a camera controller comprising:

a microcomputer;

a measuring circuit for acquiring information necessary for an operation of a camera; and an alteration circuit for altering electrical characteristics of the measuring circuit, wherein the microcomputer and the circuits are fabricated on a common semiconductor substrate.

According to a third aspect of the invention, there is provided a camera controller comprising:

a digital circuit for controlling an operation of a camera;

a measuring circuit for acquiring information necessary for the operation of the camera; and an alteration circuit for altering electrical characteristics of the measuring circuit, wherein the circuits are fabricated on a common semiconductor substrate.

According to a fourth aspect of the invention, there is provided a camera controller comprising:

a microcomputer;

an analog circuit for a camera; and an alteration circuit for altering electrical characteristics of the analog circuit, wherein the microcomputer and the circuits are fabricated on a common semiconductor substrate.

According to a fifth aspect of the invention, there is provided a controller for a remote-control camera, the controller comprising:

reception means for receiving the remote control signal transmitted from a transmission means;

control means for controlling an operation of the camera on the basis of an output from the reception means; and setting means, controlled by the control means, for setting electrical characteristics of the reception means.

According to a sixth aspect of the invention, there is provided a method of adjusting a camera system comprising:

a camera controller in which a digital circuit for controlling an operation of a camera, a measuring circuit for acquiring information necessary for the operation of the camera, and an alteration circuit for altering electrical characteristics of the measuring circuit are fabricated on a common semiconductor substrate; and a non-volatile memory for storing adjustment data for setting the electrical characteristics of the measuring circuit which are altered by the alteration circuit, the method comprising the steps of:

inputting predetermined information to the measuring circuit;

acquiring adjustment data for the alteration circuit for optimizing an output of the measuring circuit at the time of using the camera, on the basis of the output of the measuring circuit when the predetermined information has been input; and storing the adjustment data in the non-volatile memory.

According to a seventh aspect of the invention, there is provided a camera controller comprising:

means for performing measurement for acquiring information necessary for an operation of a camera;

means for altering electrical characteristics of the measuring means; and means for performing a control by altering electrical characteristics of the altering means on the basis of a measurement result of the measuring means, characterized in that the measuring means, the altering means and the control means are fabricated on a single semiconductor substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
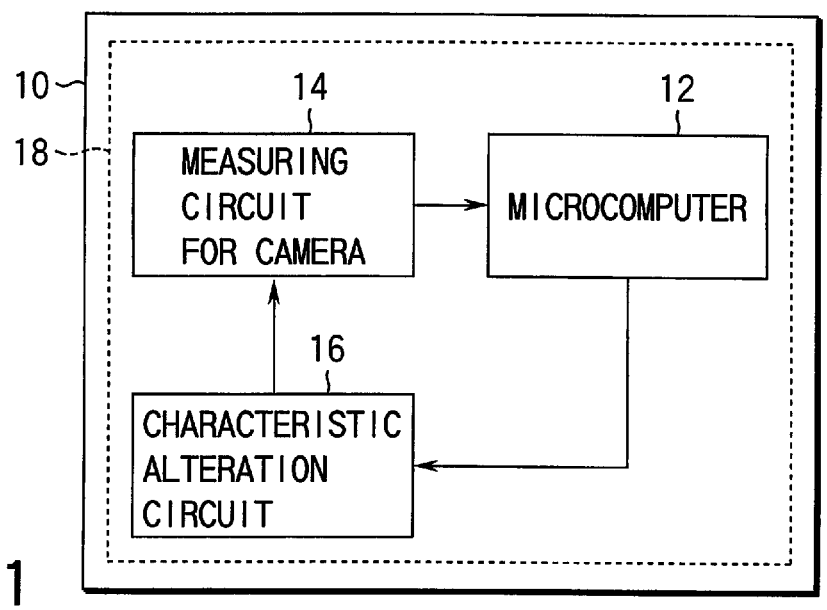
FIG. 1 is a block diagram illustrating a first concept of the present invention.

FIG. 1 is a block diagram illustrating a first concept of the present invention.

In FIG. 1, a camera controller 10 has such a structure that a microcomputer 12, a measuring circuit for camera, 14, for acquiring information necessary for the operation of a camera, and a characteristic alteration circuit 16 for altering characteristics of the measuring circuit for camera, 14, are fabricated on a single semiconductor chip 18.

In the camera controller 10 with this structure, the microcomputer 12, measuring circuit for camera, 14, and characteristic alteration circuit 16 are formed on the single semiconductor chip 18. The microcomputer 12 alters. The microcomputer 12 causes the characteristic alteration circuit 16 to alter the characteristics of the measuring circuit for camera, 14. The microcomputer 12 activates the measuring circuit for camera, 14, and controls the camera on the basis of a measurement output from the measuring circuit for camera, 14.

The measuring circuit for camera corresponds to, e.g. a distance measuring circuit or an optical measuring circuit.

Figure 2:
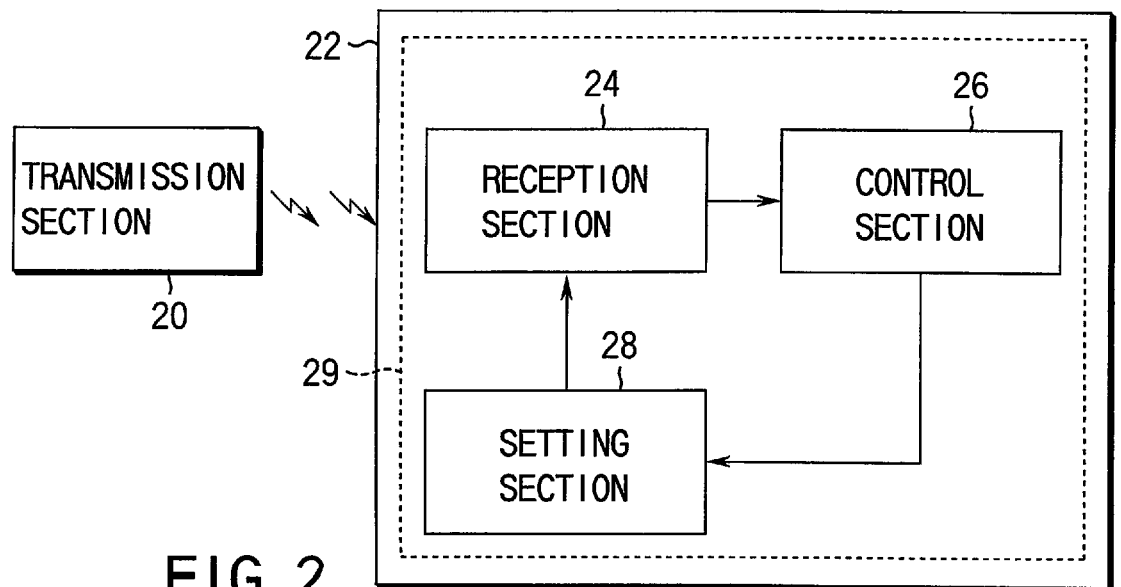
FIG. 2 is a block diagram illustrating a second concept of the invention.

Referring to FIG. 2, a second concept of the present invention will now be described.

FIG. 2 is a block diagram illustrating the second concept of the present invention.

In FIG. 2, a camera system comprises a transmission section 20 for transmitting a remote control signal, and a camera main body 22. The camera main body 22 comprises a reception section 24 for receiving a signal from the transmission section 20, a control section 26 for performing a control on the basis of an output from the reception section 24, and a setting section 28 controlled by the control section 26. These sections are formed on a common semiconductor substrate 29.

In the above structure, the setting section 28 sets the characteristics of the reception section 24, and the reception section 24 receives and detects the remote control signal from the transmission section 20. The control section 26 controls the camera main body 22 on the basis of an output from the reception section 24.

A first embodiment of the present invention will now be described with reference to the accompanying drawings.

Figure 3:
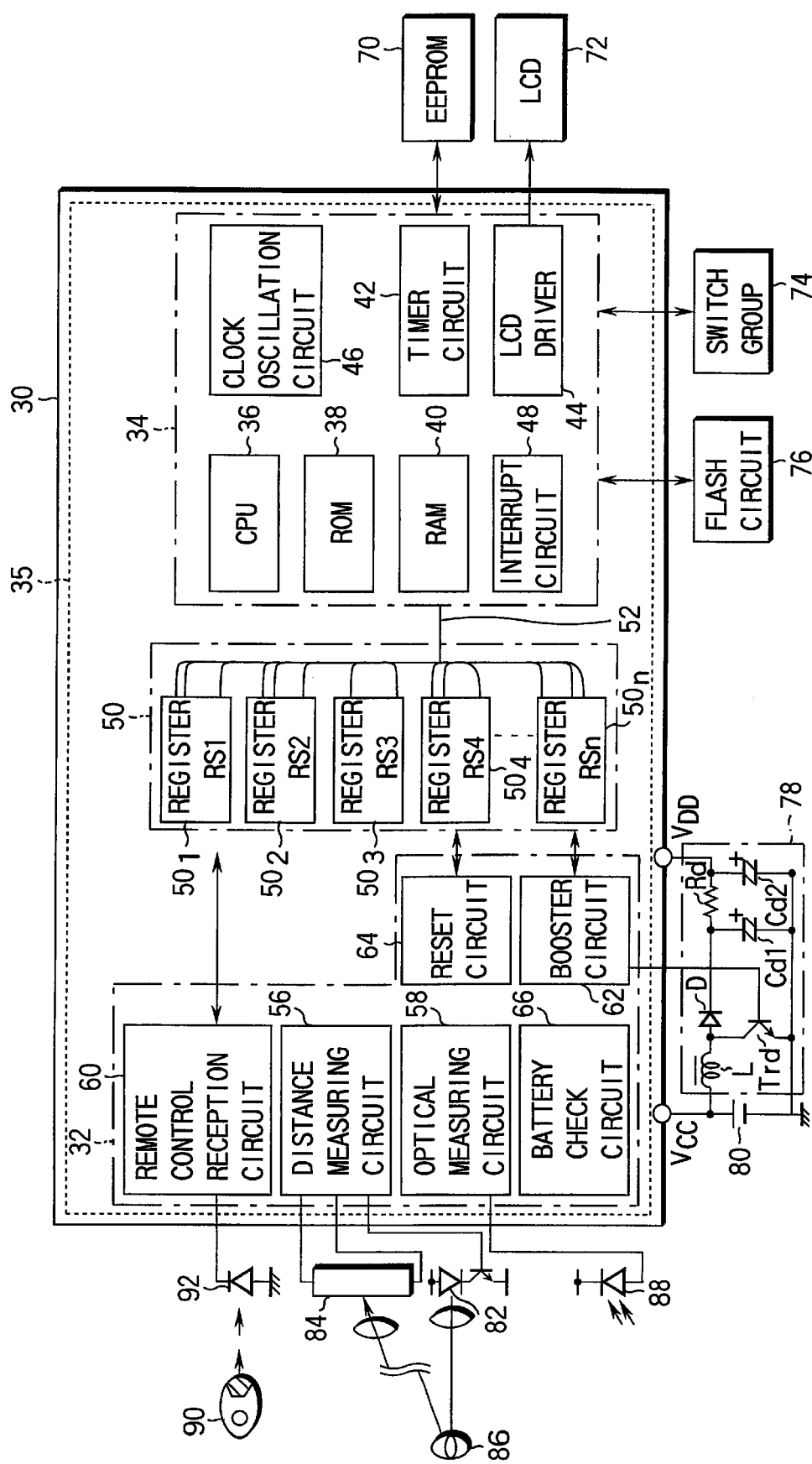
FIG. 3 is a block diagram showing a schematic structure of a camera to which a camera controller according to a first embodiment of the present invention is applied.

FIG. 3 is a block diagram showing a schematic structure of a camera to which a camera controller according to the present invention is applied.

In FIG. 3, a camera controller 30 is a camera controller using a CMOS analog circuit 32. The camera controller 30 is constructed such that a microcomputer 34 and a CMOS analog circuit 32 are integrated as a one-chip IC on a single semiconductor substrate 35 by a CMOS process.

The microcomputer 34 comprises a CPU 36, and peripheral circuits thereof including a ROM 38, a RAM 40, a timer circuit 42, an LCD driver 44, a clock oscillation circuit 46 and an interrupt circuit 48.

A register group 50 comprising a plurality of registers (RS) $50_1, 50_2, 50_3, 50_4, \ldots, 50_n$ is provided as an interface between the microcomputer 34 and CMOS analog circuit 32. Transmission of signals between the microcomputer 34 and CMOS analog circuit 32 is effected via the register group 50. The register group 50 is directly connected to a bus line 52 of the microcomputer 34 and controlled by the microcomputer 34.

On the other hand, the CMOS analog circuit 32 in the camera controller 30 comprises circuit blocks of a distance measuring circuit 56, an optical measuring circuit 58, a remote control reception circuit 60, a booster circuit 62, a reset circuit 64 and a battery check circuit 66.

An EEPROM 70, an LCD 72, a switch group 74, a flash circuit 76 and an external booster circuit 78 are connected to the camera controller 30.

The EEPROM 70 is a non-volatile memory for storing correction data, adjustment data, etc. necessary for the processing within the camera. Transmission/reception of communication data is effected between the EEPROM 70 and the microcomputer 34. The LCD 72 is driven by the LCD driver 44 to perform various display operations.

The switching states of the switch group 74 are detected by the microcomputer 34. Similarly, the flash circuit 76 is controlled by the microcomputer 34.

An infrared emitting diode (IRED) 82 and a semiconductor position detector (PSD) 84 are connected to the distance measuring circuit 56. Infrared pulse light is emitted from the IRED 82 to a subject 86, and reflection light from the subject 86 is received by the PSD 84. A light reception position of the reflection light from the subject 86 is detected from an output optical current from the PSD 84. Based on the light reception position, the distance of the subject is found according to a trigonometrical principle.

A silicon photodiode (SPD) 88 functioning as an optical measuring element is connected to the optical measuring circuit 58. An optical current from the SPD 88 is measured to determine the luminance of the subject 86.

A photodiode 92 for receiving and detecting a remote control signal from a remote control transmitter 90 is connected to the remote control reception circuit 60.

A battery (BAT) 80 is used as a power supply for the camera. A battery voltage $V_{CC}$ is boosted to a predetermined level by the booster circuit 62 in the camera controller 30 and the external booster circuit 78. The boosted voltage is supplied as power supply $V_{DD}$ to the camera controller 30.

The power supply $V_{CC}$ is used in the block with high power consumption for, e.g. a light emission operation of the IRED 82 and a boosting operation. The power supply $V_{DD}$ is used in the block for measuring weak signals, such as the distance measuring circuit 56, optical measuring circuit 58 or remote control reception circuit 60.

The operation of the camera controller 30 will now be described with reference to the flow chart of FIG. 4.

Figure 4:
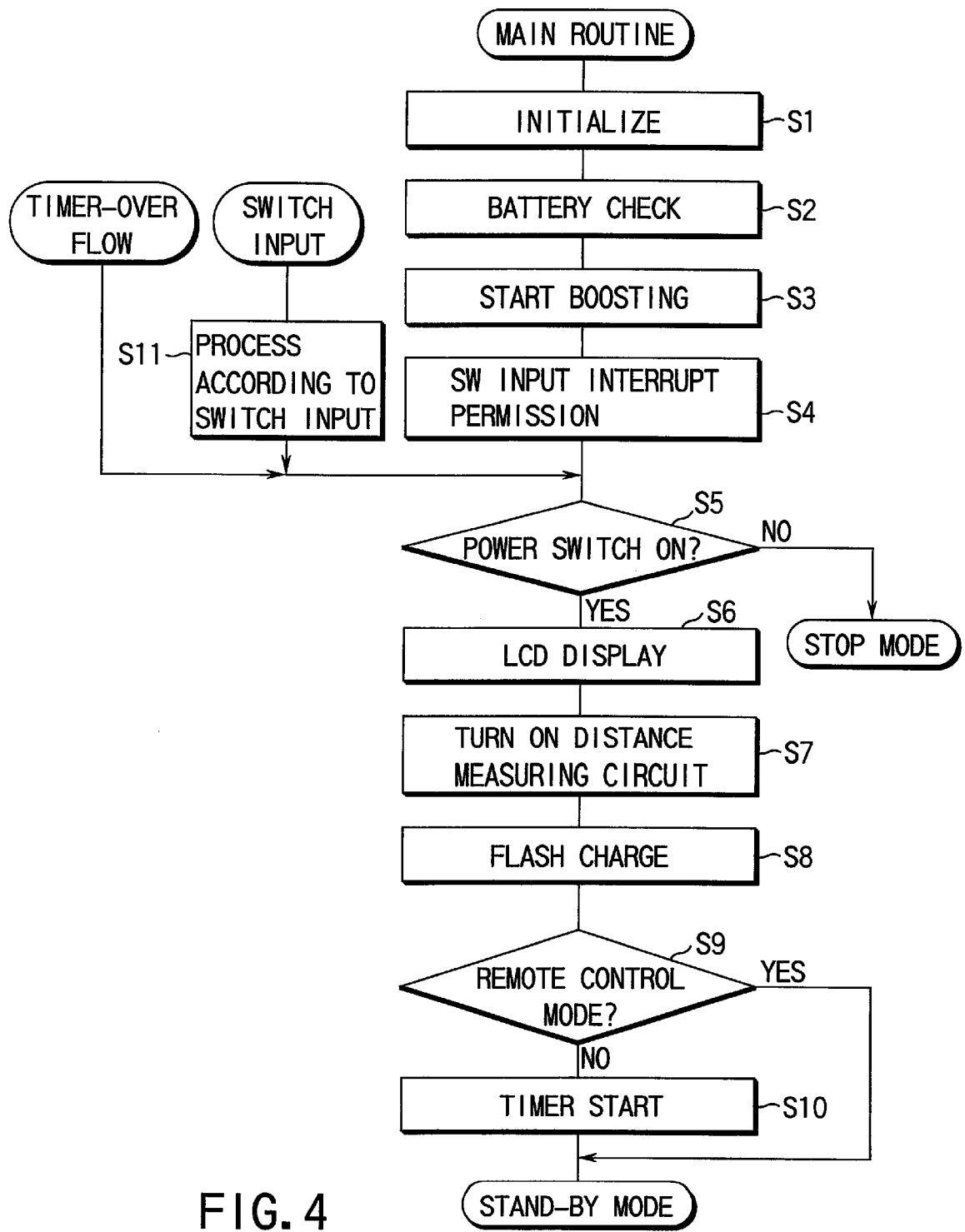
FIG. 4 is a flow chart illustrating the operation of a main routine executed by a microcomputer 34 in a camera controller 30.

FIG. 4 is a flow chart illustrating the operation of a main routine executed by the microcomputer 34 in the camera controller 30.

If the battery is set in the camera body, the reset circuit 64 resets the camera controller 30 and the clock oscillation circuit 46 starts oscillation. The CPU 36 starts operation according to a sequence program stored in the ROM 38.

In step S1, the CPU 36 initializes the port, RAM 40, register group 50, CMOS analog circuit 32, etc.

In step S2, the CPU 36 causes the battery check circuit 66 to check the battery capacity. If the battery capacity is adequate, the control goes to step S3.

In step S3, the booster circuit 62 and external booster circuit 78 are operated to provide the operation voltage $V_{DD}$ for the entire camera system. In a subsequent step S4, an interrupt is permitted by the interrupt circuit 48, etc. and the input of the operation switches such as the power switch is permitted.

In step S5, the state of the power switch is determined. If the power switch is off, the oscillation of the clock oscillation circuit 46, which is the original oscillation for the CPU 36, is stopped, and the control enters the stop mode which is a low power consumption mode. In the stop mode, the switches accepted by the CPU 36 are only the power switch connected to the port with the interrupt function, a rear cover switch and a rewind switch, and the other switches are not accepted.

On the other hand, when the power switch is on in step S5, the control goes to step S6. In step S6, the LCD 72 is turned on by the LCD driver 44 to perform the display function. In the next step S7, the distance measuring circuit 56 is turned on. In step S8, flash charging is performed, and energy for flash light is charged in a main capacitor in the flash circuit 76.

In step S9, it is determined whether the present mode is the remote control mode. If it is the remote control mode, the remote control reception circuit 60 is set in the standby state for ready operation. In the standby state, the stop mode is set. Although the clock oscillation circuit 46, which is the original oscillation circuit, is activated in the stop mode, clock signals are supplied only to the minimum necessary elements such as the LCD 72. If a remote control signal is received in the remote control mode from the remote control transmitter 90 provided outside the camera, the release operation is performed.

On the other hand, if the setting of the remote control mode is not determined in step S9, the control goes to step S10 and the timer count of the timer circuit 42 is started. Then, the standby mode is set. This standby mode is released when the operation switch is operated or when the timer has overflow.

If the timer has overflow, the standby mode is released and the control goes to step S5. Then, the above-described process is repeated.

If the operation switch has been operated, the standby state is released and in step S11 the processing according to the operated switch is carried out. Then, the control goes to step S5 and the same processing is repeated.

With reference to the flow chart of FIG. 5, a description will now be given of the operation of a sub-routine "RELEASE" executed when a release switch (not shown) has been depressed or when a remote control signal has been received.

Figure 5:
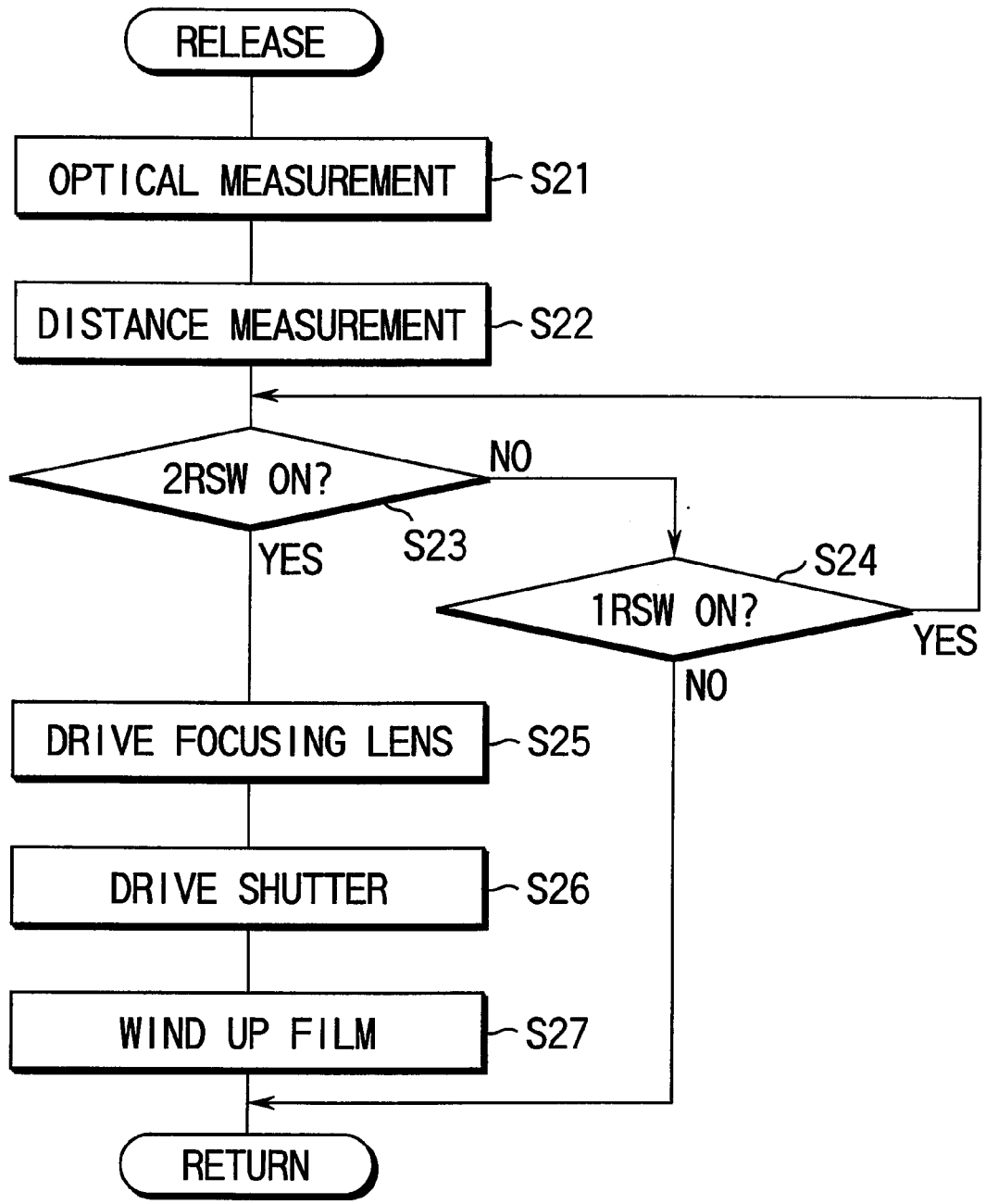
FIG. 5 is a flow chart illustrating the operation of a sub-routine "RELEASE" executed when a release switch has been depressed or when a remote control signal has been received.

If the sub-routine "RELEASE" illustrated in FIG. 5 is initiated, an optical measurement start signal is output to the optical measuring circuit 58 via the register group 50 in step S21. The optical measuring circuit 58 performs an optical measuring operation for measuring the luminance of the subject. The obtained optical measurement result is output to the microcomputer 34 via the register group 50. In the microcomputer 34, the optical measurement data is stored in the RAM 40.

In step S22, the microcomputer 34 outputs a distance measurement control signal to the distance measuring circuit 56 via the register group 50. The distance measuring circuit 56 executes the distance measuring operation and, as a result, communicates with the microcomputer 34 via the register group 50. Thereby, the microcomputer 34 receives distance measurement data, and this data is stored in the RAM 40.

In step S23, it is determined whether a second release switch (2RSW)(not shown) is turned on. If the second release switch is not turned on, the control goes to step S24. If the second release switch is not turned on and a first release switch (1RSW) (not shown) is turned off, the control returns. If the second release switch is not turned on and the first release switch is turned on, steps S23 and S24 are repeated and the control waits until the second release switch is turned on.

If the second release switch is turned on in step S23, the control advances to step S25. Based on the distance measurement data, a focusing lens (not shown) is driven to an in-focus position. In step S26, the shutter is controlled on the basis of the optical measurement data by the optical measuring operation, and a film (not shown) is exposed. In step S27, the film is wound up and the control then returns.

Figure 6:
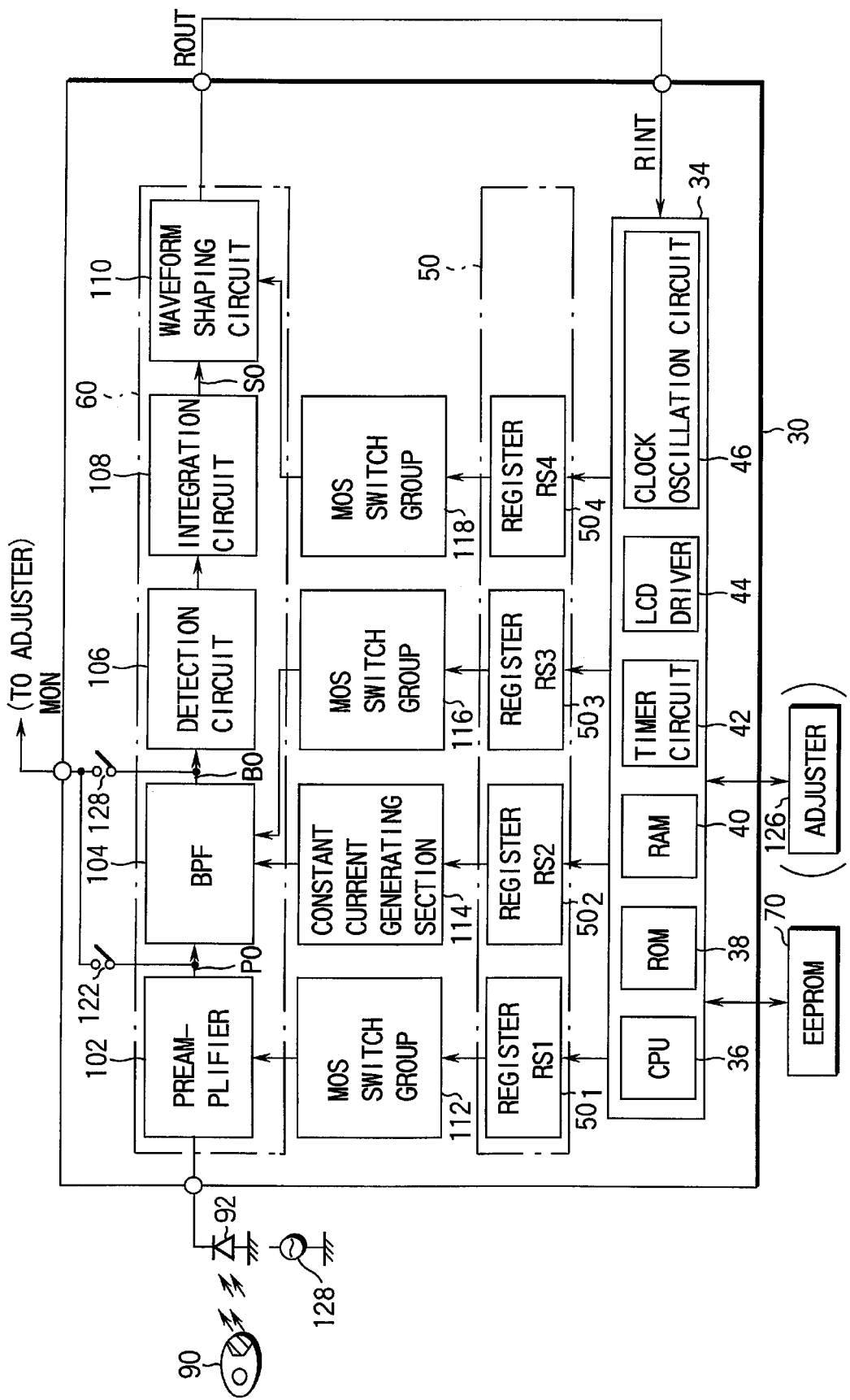
FIG. 6 is a block diagram showing the structures of a register group 50 and a remote control reception circuit 60 relating to the remote control operation in the camera controller 30.

FIG. 6 is a block diagram showing the structures of the register group 50 and remote control reception circuit 60 relating to the remote control operation in the camera controller 30. FIGS. 7A to 7F show waveforms in the respective sections when the remote control signal from the remote control transmitter 90 has been received.

The remote control reception circuit 60 and register group 50 will be described.

Figure 7:
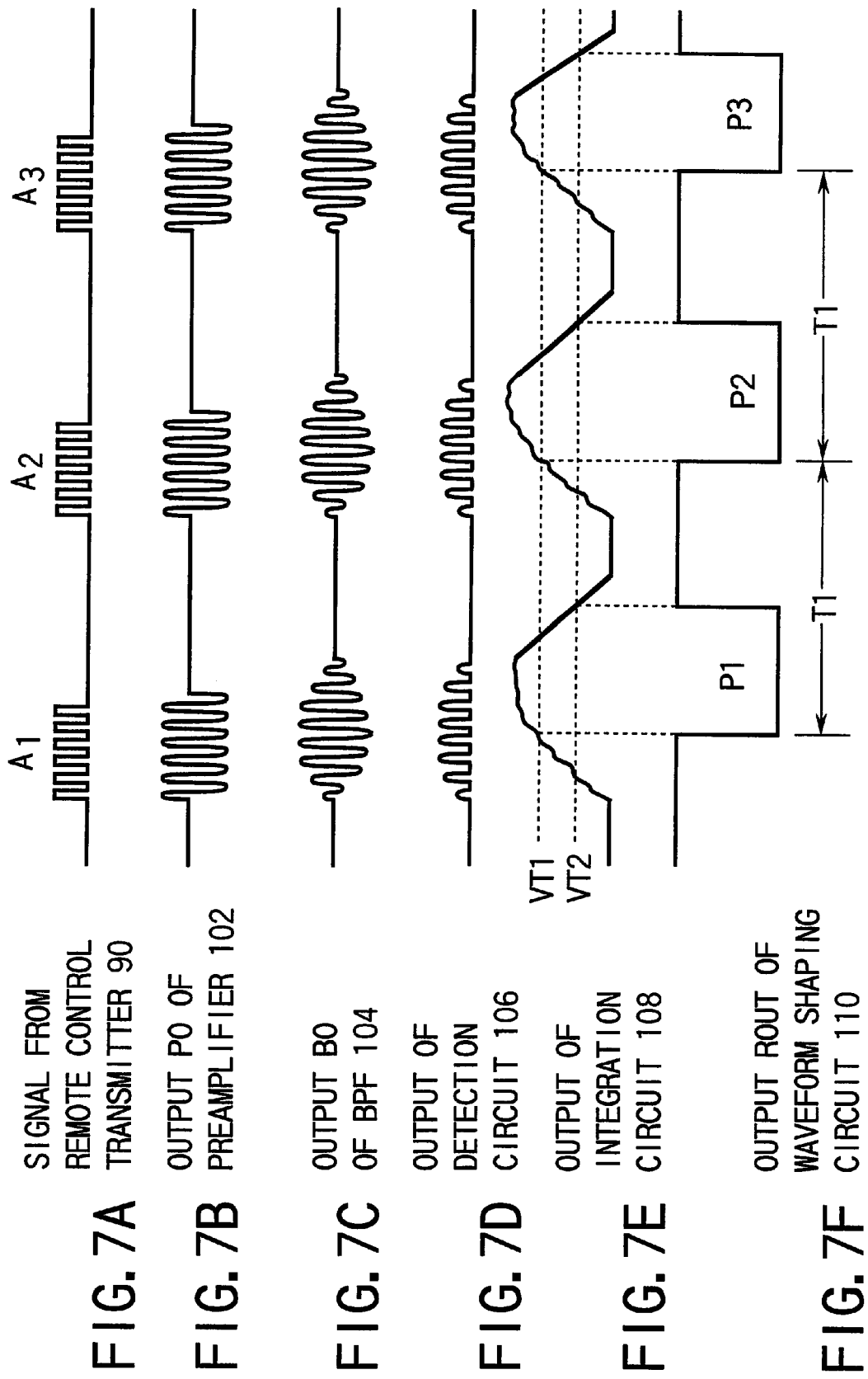
FIGS. 7A to 7F show waveforms in the respective sections when a remote control signal from a remote control transmitter 90 has been received.

The photodiode 92 is a light receiving element for receiving remote control signals $A_1$, $A_2$ and $A_3$, as shown in FIG. 7A, and it is connected to an input of a preamplifier 102. The preamplifier 102 amplifies the input weak signal to a signal as shown in FIG. 7B. The amplified signal is supplied to a next-stage band-pass filter (BPF) 104.

The BPF 104 is a band-pass filter having a pass band corresponding to a transmission signal obtained by amplitude-modulating a carrier of frequency $f_0$. The BPF 104 is a filter for passing only frequency components near the central frequency $f_0$. The band pass filter 104 outputs to a next-stage detection circuit 106 a signal, as shown in FIG. 7C, which consists of a remote control transmission signal component alone and from which a noise component of a ripple frequency (100 Hz or 120 Hz) that is double the commercial frequency for fluorescent lamps, etc. has been eliminated.

The detection circuit 106 detects the output from the BPF 104 and outputs a signal as shown in FIG. 7D. Furthermore, an integration circuit 108 integrates the output from the detection circuit 106 and eliminates a carrier component. Thus, an output signal as shown in FIG. 7E has been generated.

A waveform shaping circuit 110 compares the output from the integration circuit 108 with predetermined threshold levels VT1 and VT2 with hysteresis, and subjects it to waveform shaping. Output pulse signals P1, P2 and P3, as shown in FIG. 7F, are generated at an output ROUT, and input to an interrupt input port RINT of the microcomputer 34.

The signals at the output terminal ROUT may be input to the microcomputer 34 via the register group 50, and not to the interrupt input port RINT of microcomputer 34. In this case, the terminal RINT can be used for another purpose. Since the number of terminals can be decreased, the manufacturing cost can be reduced.

The register group 50 comprises, e.g. a plurality of registers $50_1$ to $50_4$. An output from the register $50_1$ is delivered to the preamplifier 102 via a MOS switch group 112. An output from the register $50_2$ is delivered to the BPF 104 via a constant current generating section 114. An output from the register $50_3$ is delivered to the BPF 104 via a MOS switch group 116. An output from the register $50_4$ is delivered to the waveform shaping circuit 110 via a MOS switch group 118.

An output PO from the preamplifier 102 and an output BO from the BPF 104 are supplied via MOS switches 122 and 124 and a monitor terminal MON to an adjuster 126 connected to the microcomputer 34. Numeral 128 denotes a signal source.

Figure 8:
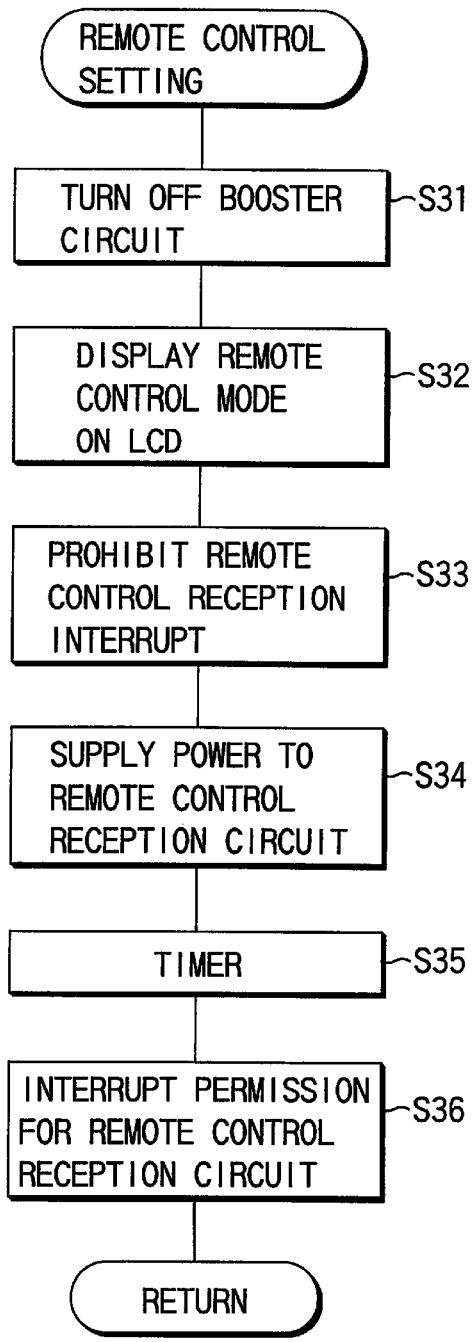
FIG. 8 is a flow chart illustrating the operation of a sub-routine "REMOTE CONTROL SETTING"

Referring to the flow chart of FIG. 8, a description will now be given of the operation of a sub-routine "REMOTE CONTROL SETTING".

If turning-on of a remote control mode setting switch provided on the camera body has been detected, a bias to the booster circuit 62 is cut to turn off the booster circuit 62 in step S31. In step S32, the indication of the remote control mode is made by the LCD 72. In a subsequent step S33, an interrupt to the remote control interrupt terminal RINT is prohibited.

In step S34, supply of a bias to the remote control reception circuit 60 is started. Thereafter, in step S35, the timer counts a start-up stabilization time for the remote control reception circuit 60, and the control waits. In step S36, the interrupt to the remote control interrupt terminal RINT is permitted and the control returns.

Figure 9:
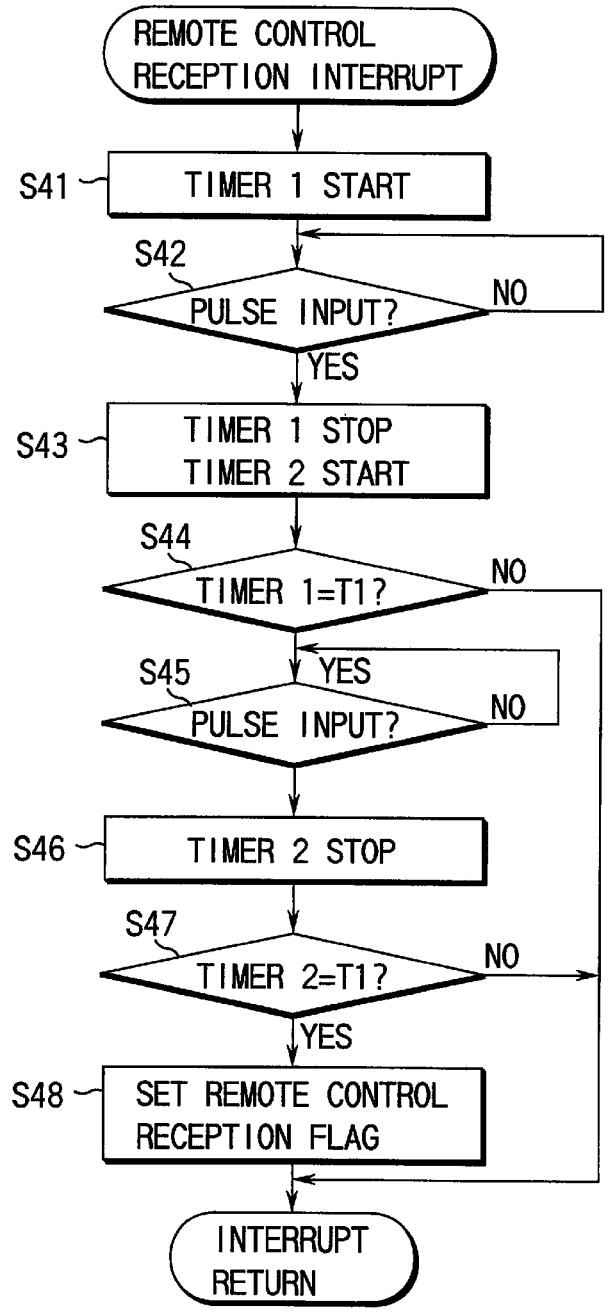
FIG. 9 is a flow chart illustrating the operation of a sub-routine "REMOTE CONTROL RECEPTION INTERRUPT"

Referring to the flow chart of FIG. 9, a description will now be given of the operation of a sub-routine "REMOTE CONTROL RECEPTION INTERRUPT".

If an interrupt to the terminal RINT has occurred in the remote control mode, the process of the "REMOTE CONTROL RECEPTION INTERRUPT" begins.

An interrupt is generated by the signal P1 shown in FIG. 7F, and the control enters step S41.

In step S41, a timer 1 (not shown) in the timer circuit 42 of microcomputer 34 starts counting. In step S42, a pulse input to the terminal RINT is awaited. If a pulse input is delivered to the terminal RINT, the timer 1 stops counting in step S43 and a timer 2 (not shown) in the timer circuit 42 starts counting.

In step S44, it is determined whether the count value in the timer 1 is T1. If the count value is T1, the control goes to step S45. If the count value is not T1, noise, instead of the remote control signal, is determined, and the control returns.

In step S45, the input of the pulse (P3) is awaited. If the pulse is input, the control goes to step S46, and the timer 2 is stopped. In step S47, it is determined whether the count value of the timer 2 is T1. If the count value is T1, the control goes to step S48 to set a remote control reception flag, and the control returns.

On the other hand, if the count value is not T1 in step S47, presence of noise is determined and the control returns.

Figure 10:
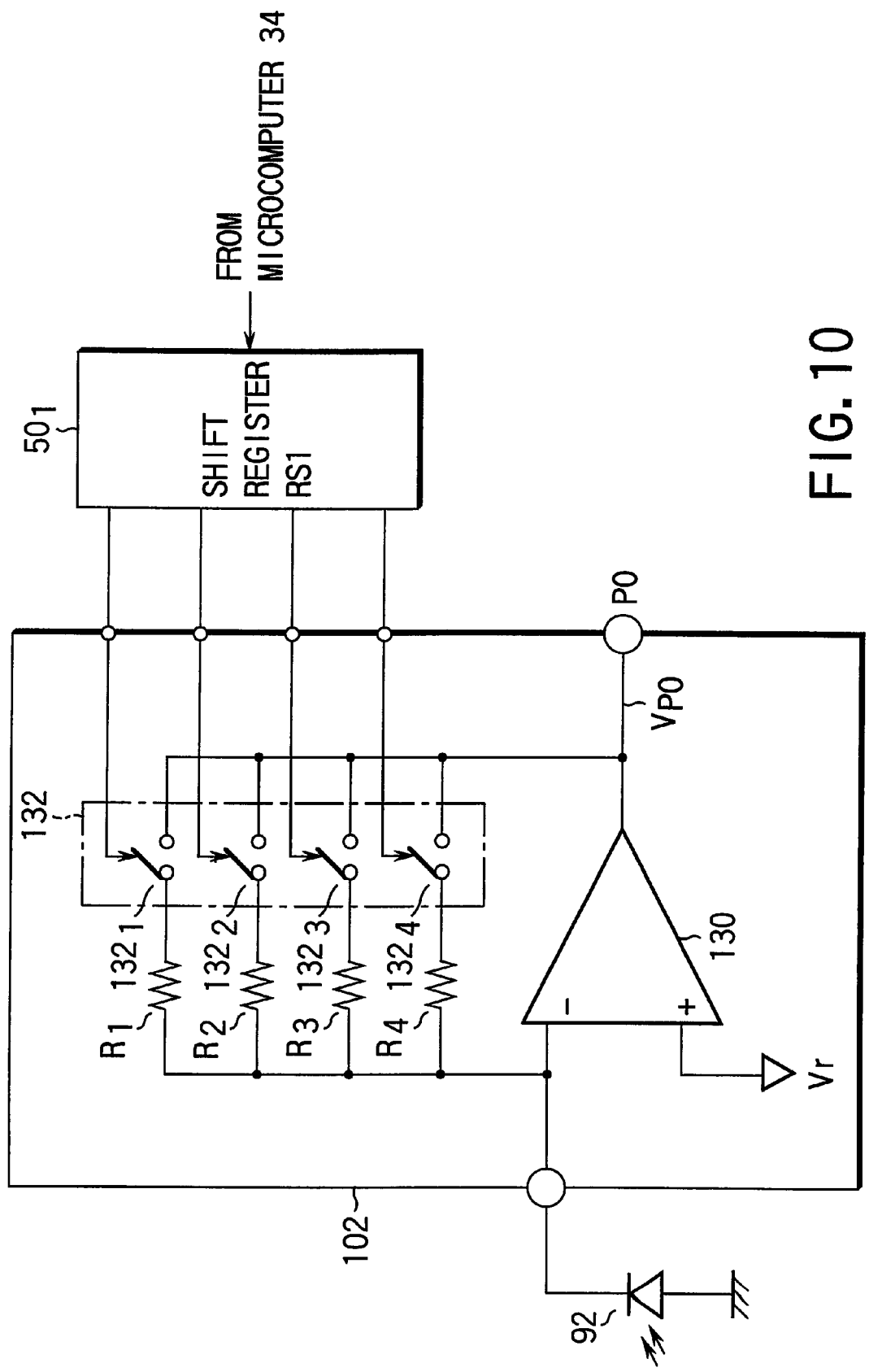
FIG. 10 shows the structure of a preamplifier 102 and peripheral circuits thereof shown in FIG. 6.

FIG. 10 shows the structure of the preamplifier 102 and peripheral circuits thereof shown in FIG. 6.

In FIG. 10, the preamplifier 102 comprises an operational amplifier 130 and feedback resistors $R_1$, $R_2$, $R_3$, and $R_4$. A non-inversion input of the operational amplifier 130 is connected to a reference voltage Vr, and an inversion input thereof is connected to an anode of the photodiode 92 and feedback resistors $R_1$ to $R_4$.

A MOS switch group 132 ($132_1$, $132_2$, $132_3$, $132_4$) is connected between the feedback resistors $R_1$ to $R_4$ and the output of the operational amplifier 130. As mentioned above, the MOS switches $132_1$ to $132_4$ of the MOS switch group 132 are selectively turned on by the shift register $50_1$.

In the above structure, optical current $I_{PD}$ generated by the photodiode 92 is output from the operational amplifier 130 and flows to the non-inversion input of the operational amplifier 130 via the selected feedback resistor. Accordingly, the output Vpo of preamplifier 130 is amplified in accordance with the selected feedback resistor, as given by equation (1):

$$Vpo = I_{PD} \cdot Rn + Vr \qquad (1)$$

Figure 11:
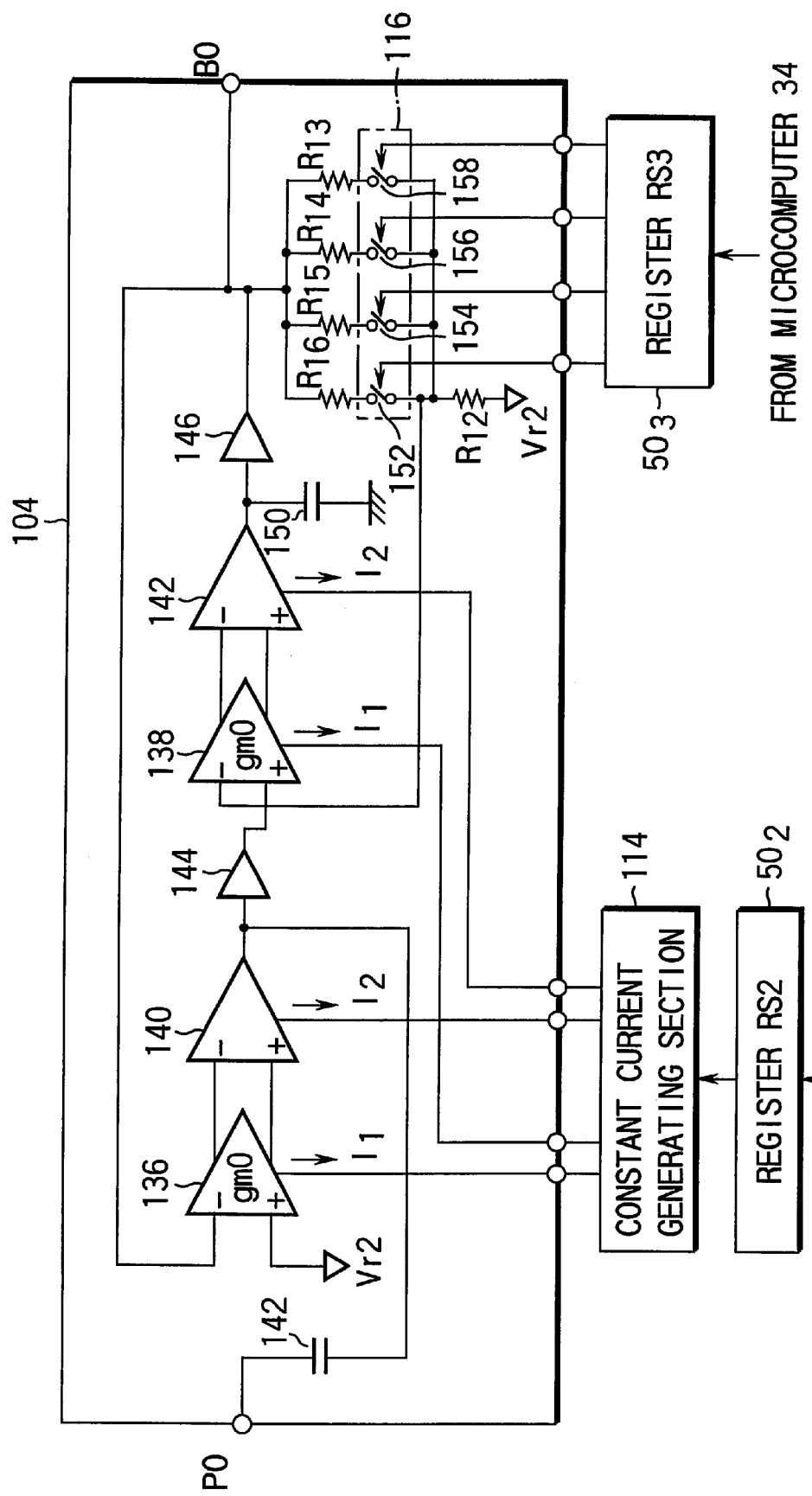
FIG. 11 shows in detail the structure of a BPF 104 and peripheral circuits thereof shown in FIG. 6.

FIG. 11 shows in detail the structure of the BPF 104 and peripheral circuits thereof shown in FIG. 6.

In FIG. 11, the BPF 104 comprises an active filter using a conversion conductance gm. Outputs of conversion conductance amplifiers (hereinafter "gm amplifier") 136 AND 138 connected to the constant current generating section 114 are delivered to buffers 144 and 146 via differential circuits 140 and 142 connected to the constant current generating section 114. Capacitors 148 and 150 are connected to the input sides of the buffers 144 and 146.

The MOS switch group 116 includes MOS switches 152, 154, 156 and 158. The MOS switch group 116 is connected to the input of the gm amplifier 136 via resistors $R_{12}$ and $R_{13\text{-}16}$.

The gm amplifiers 136 and 138 are biased with constant current $I_1$ from the constant current generating section 114. Similarly, the differential 140 and 142 are biased with constant current $I_2$ from the constant current generating section 114.

If the conversion conductance of the gm amplifiers 136 and 138 is gm0, the total conversion conductance gm of the gm amplifiers 136 and 138 and differential circuits 140 and 142 is given by equation (2):

$$gm = gm0 \cdot I_1/I_2 \qquad (2)$$

The central frequency $f_0$ of the BPF 104 with the above structure is given by equation (3):

$$f_0 = gm/(4 \cdot \pi \cdot C) \cdot (I_1/I_2) \qquad (3)$$

A frequency selection ratio Q of the BPF 104 is given by equation (4):

$$Q = (Rm + R_{12})/R_{12} \qquad (4)$$

(where $RM = R_{13} - R_{16}$)

Symbol Rm indicates a resistance value of one of, or a composite resistance value of two or more of, the resistors $R_{16}$–$R_{13}$ selected by the MOS switches of MOS switch group 116 which are selectively turned on by the microcomputer 34 via the register $50_3$.

Accordingly, the frequency selection ratio Q of the BPF 104 can be varied.

Figure 12:
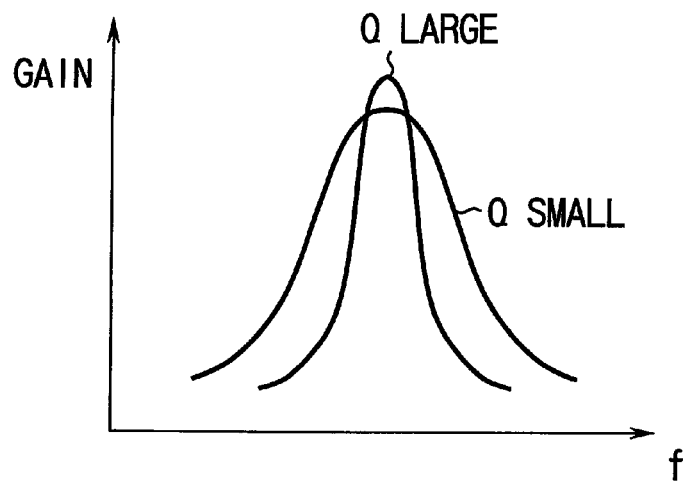
FIG. 12 is a graph showing frequency characteristics when a frequency selection ratio Q of the BPF 104 is varied.

FIG. 12 is a graph showing frequency characteristics when the frequency selection ratio Q of the BPF 104 is varied.

Figure 13:
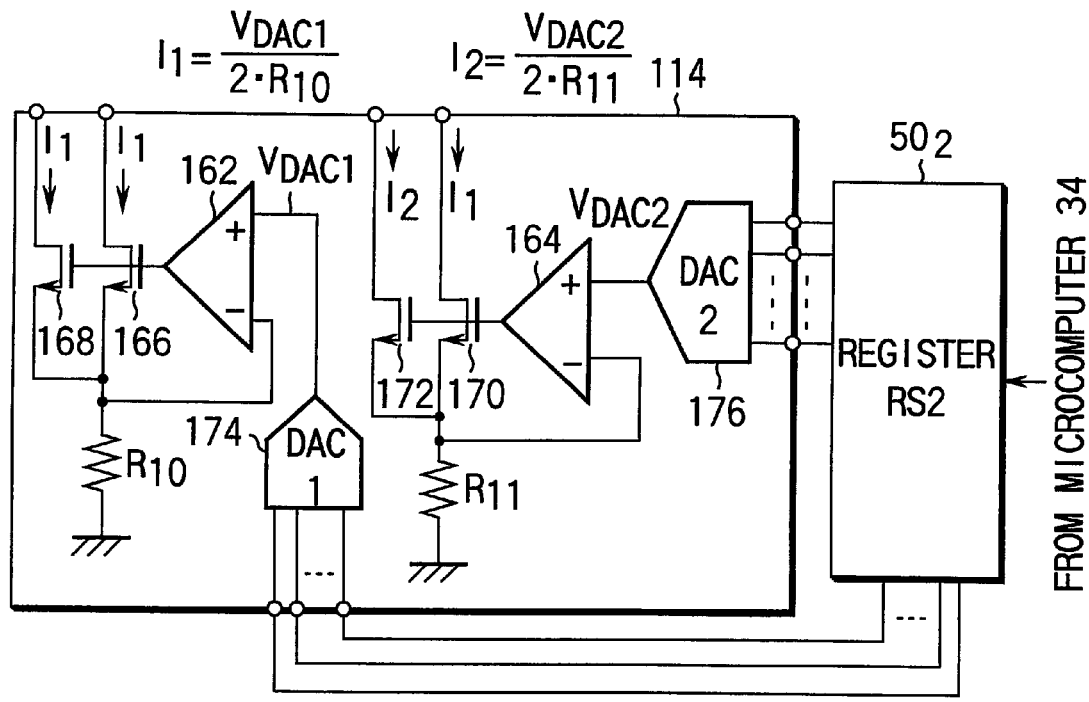
FIG. 13 shows in detail the structure of a constant current generating section 114 relating to setting of a central frequency $f_0$ of the BPF 104.

FIG. 13 shows in detail the structure of the constant current generating section 114 relating to setting of the central frequency fo of the BPF 104.

In FIG. 13, the constant current generating section 114 comprises operational amplifiers 162 and 164, NMOS transistors 166, 168, 170 and 172, resistors $R_{10}$ and $R_{11}$, and D/A converters (DAC1) 174 and (DAC2) 176.

The D/A converters 174 and 176 are set by the microcomputer 34 via the register (RS2) $50_2$ and deliver output voltages $V_{DAC1}$ and $V_{DAC2}$. The operational amplifier 162, NMOS transistors 166 and 168 and resistor $R_{10}$ constitute a constant current circuit which outputs a constant current $I_1$ expressed by equation (5):

$$I_1 = V_{DAC1} R_{10}/2 \qquad (5)$$

The same applies to the operational amplifier 164, NMOS transistors 170 and 172 and resistor $R_{11}$, and a constant current $I_2$ expressed by equation (6):

$$I_2 = V_{DAC2}/R_{11}/2 \qquad (6)$$

In this manner, the constant currents $I_1$ and $I_2$ of the constant current generating section 114 are set by the microcomputer 34 via the register $50_2$. Thus, the central frequency fo of BPF 104 can be varied.

Figure 14:
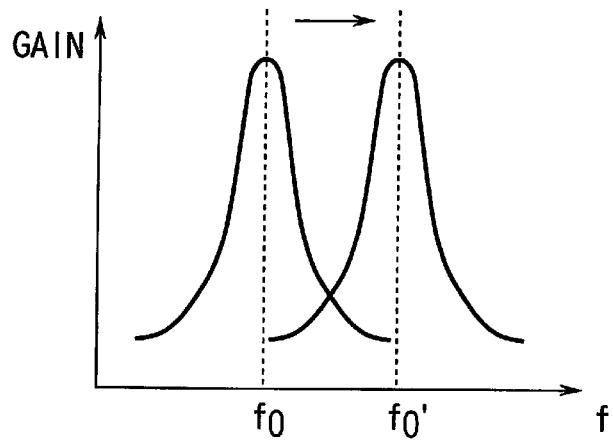
FIG. 14 is a graph showing frequency characteristics when the central frequency $f_0$ of the BPF 104 is varied.

FIG. 14 is a graph showing frequency characteristics when the central frequency $f_0$ of the BPF 104 is varied.

Figure 15:
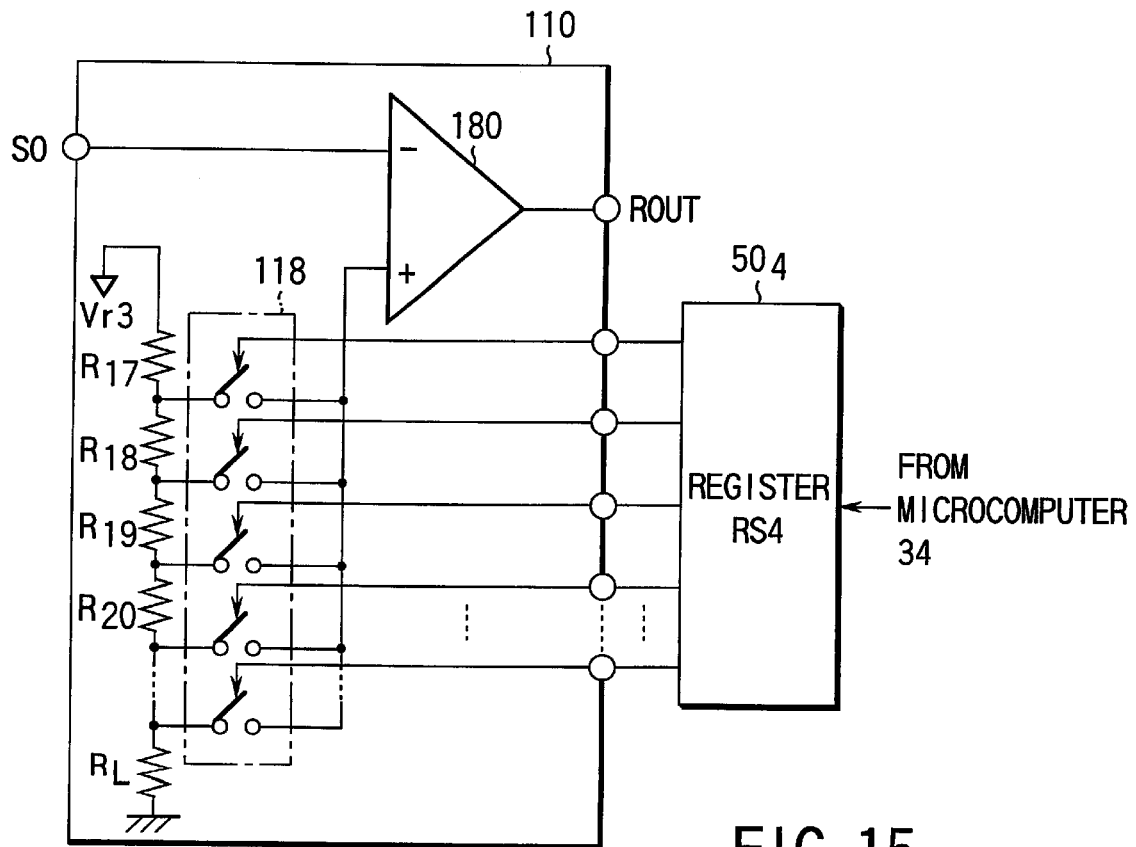
FIG. 15 shows in detail the structure of a waveform shaping circuit 110.

FIG. 15 shows in detail the structure of the waveform shaping circuit 110.

In FIG. 15, the waveform shaping circuit 110 comprises a comparator 180, series-connected resistors $R_{17}$, $R_{18}$, $R_{19}$, $R_{20}$, ..., $R_L$, and the aforementioned MOS switch group 118.

The microcomputer 34 selectively turns on the MOS switches of the MOS switch group 118 via the register $50_4$. In accordance with the turned-on MOS switch, a voltage produced by resistance-dividing a constant voltage Vr3 is input to a non-inversion input of the comparator 180.

Since an inversion input of the comparator 180 receives an output SO from the above-mentioned integration circuit 108, the threshold levels VT1 and VT2 can be varied.

A description will now be given of the adjustment of the gain of the preamplifier 102 and the central frequency $f_0$ of the BPF 104.

In FIG. 6, if an adjustment start signal is input to the microcomputer 34 from the adjuster 126, the adjustment operation begins. With the operation of the adjuster 126, a voltage signal (or a current signal) with the same carrier frequency $f_{cl}$ as the transmission signal from the remote control transmitter 90 is input from the signal source 128 to the input of the preamplifier 102 in the remote control reception circuit 60. Alternatively, the photodiode 92 may be set in the connected state and the remote control signal may be transmitted from the remote control transmitter 90.

With the operation of the microcomputer 34, the adjuster 126 issues a command, and data is set in the MOS switch group 112 via the shift register $50_1$. In addition, the MOS switch 122 is turned on, and the output PO from the preamplifier 102 is connected to the monitor terminal MON.

In the adjuster 126, the output from the preamplifier 102 is monitored at the monitor terminal MON, and a command is sent to the microcomputer 34 so that the set data in the MOS switch group 112 may be varied. In the adjuster 126, the monitor output MON is referred to, and such set data in the MOS switch group 112 that the output of the preamplifier 102 takes a maximum value is determined to be adjustment data (gain data).

The adjuster 126 sends a command to the microcomputer 34 so that the adjustment data may be stored at a predetermined address in the EEPROM 70.

Then, the adjuster 126 adjusts the central frequency $f_0$ of the BPF 104. With a command from the adjuster 126, the microcomputer 34 sets the current set data in the constant current generating section 114 via the register $50_2$, and the output BO from the BPF 104 is connected to the monitor terminal MON (MOS switch 124 turned on).

While referring to the monitor terminal output MON, the adjuster 126 transmits a command to the microcomputer 34, and the current set data is varied. Such current set data as to raise the output level of the BPF 104 to a maximum is retrieved as adjustment data. After the adjustment, the adjuster 126 transmits a command to the microcomputer 34, and this current set data is stored at a predetermined address in the EEPROM 70.

When the camera is activated, at the initial setting, the adjustment data (gain data, fo data) is read out from the EEPROM 70 by the microcomputer 34 and stored in the RAM 40 at the predetermined location. If the remote control mode is set, the microcomputer 34 sets the gain data and fo data stored in the RAM 40 into the registers 501 to 503 and starts the operation of the remote control reception circuit 60.

The frequency selection ratio Q of the BPF 104 and the threshold levels VT1 and VT2 of the waveform shaping circuit 110 can similarly be adjusted and optimally set. The adjusted data is stored at a predetermined address in the EEPROM 70.

Thereby, the reception operation can be performed with the gain of the preamplifier 102 optimally set as well as the central frequency $f_0$ of the BPF 104 optimally set. Accordingly, the distance for remote control is extended and the operability is enhanced.

Where remote control signals are received from a plurality of different remote control transmitters, the central frequency $f_0$ of the BPF 104 is similarly adjusted for the carrier frequency $f_{c2}$ of another transmitter. In addition, the adjusted data is similarly stored in another area of the EEPROM 70. Where a different remote control mode is set, the associated data is read out from the EEPROM 70 and set in the register $50_2$.

Furthermore, the above-described first embodiment is directed to the case where the camera controller 30 is constituted by the CMOS process. The first embodiment, however, is not limited to this case. For example, even if a BiCMOS process is used and the remote control reception circuit 60 is constituted by a bipolar process, the same advantages can be obtained.

In the first embodiment, the measuring circuit for camera was described as the remote-control reception circuit, but it may be a distance-measuring circuit or an optical measuring circuit.

Figure 16:
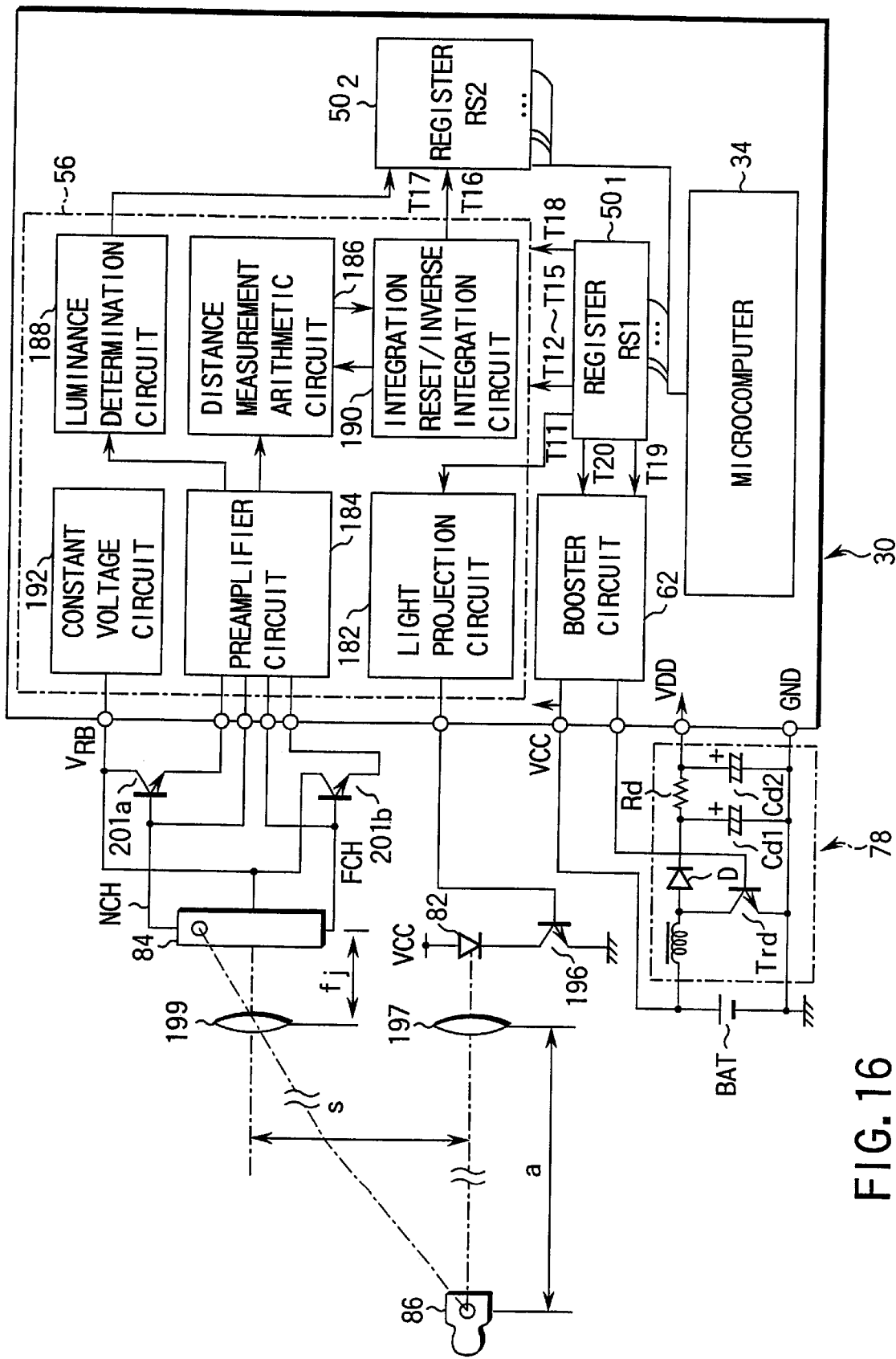
FIG. 16 shows the structures of registers RS1 and RS2 and a distance measuring circuit 56 relating to a distance measuring operation in the camera controller 30.

FIG. 16 shows the structures of registers (RS1) $50_1$ and (RS2) $50_2$ and the distance measuring circuit 56 relating to the distance measuring operation in the camera controller 30.

The distance measuring circuit 56 comprises a light projection circuit 182, a preamplifier circuit 184, a distance measurement arithmetic circuit 186, a luminance determination circuit 188, an integration reset/inverse integration circuit 190 and a constant voltage circuit 192.

If the microcomputer 34 starts the distance measuring operation, it first performs a background light elimination operation (to be described later). If the distance measuring operation is started, the microcomputer 34 outputs a light emission signal as an output T11 to the distance measuring circuit 56 via the register $50_1$.

If the light emission signal T11 is input to the distance measuring circuit 56 from the register $50_1$, the light projection circuit 182 is operated. The light projection circuit 182 turns on/off an external power transistor 196. With the operation of the power transistor 196, pulse light emitted from the IRED 82 is converged through a light projection lens 197 and radiated on the subject 86 located at a subject distance a. Reflection light from the subject 86 is focused on a light receiving surface of the PSD 84, which is situated at a focal distance fj of a light reception lens 199, through the light reception lens 199 situated at a distance of basic line length S from the light projection lens 197.

The preamplifier circuit 184 including a pair of amplifying NPN transistors 201a and 201b detects signal photoelectric currents output from terminals NCH and FCH of the PSD 84. Thus, reflection pulse light from the subject, which was emitted from the IRED 82, is received, and a signal pulse photoelectric current component is detected.

As is disclosed in U.S. Pat. No. 5,557,363, where the output signal currents from the PSD 84 are In and If, the following relationship is established:

$$In/(In+If) \propto 1/a \quad (a=\text{subject distance}) \qquad (7)$$

The distance measurement arithmetic circuit 186 performs arithmetic operations of the formula (7) on the basis of the detected photoelectric current component signal, and acquires distance information of the subject.

The microcomputer 34 refers to an output T16 of the register $50_2$, which is delivered from the integration reset/inverse integration circuit 190, and A/D converts the distance measurement data. Thus, the A/D-converted distance measurement data is obtained.

The operations of the respective circuits are controlled by the microcomputer 34 by means of output signals T12 to T15 from the register $50_1$. In the microcomputer 34, the obtained distance measurement data is stored in the internal RAM 40.

The EEPROM 70 can communicate with the microcomputer 34 and can store distance measurement data adjustment values, correction values, etc. for different cameras.

The luminance determination circuit 188 compares the output from the preamplifier circuit 184 with a predetermined determination level, determines a luminance value, and generates an output signal T17. The signal T17 is delivered to the microcomputer 34 via the register $50_2$.

A remote control terminal of the PSD 84 and a power supply of the preamplifier 184 are connected to an output $V_{RB}$ of the constant voltage circuit 192.

Figure 17:
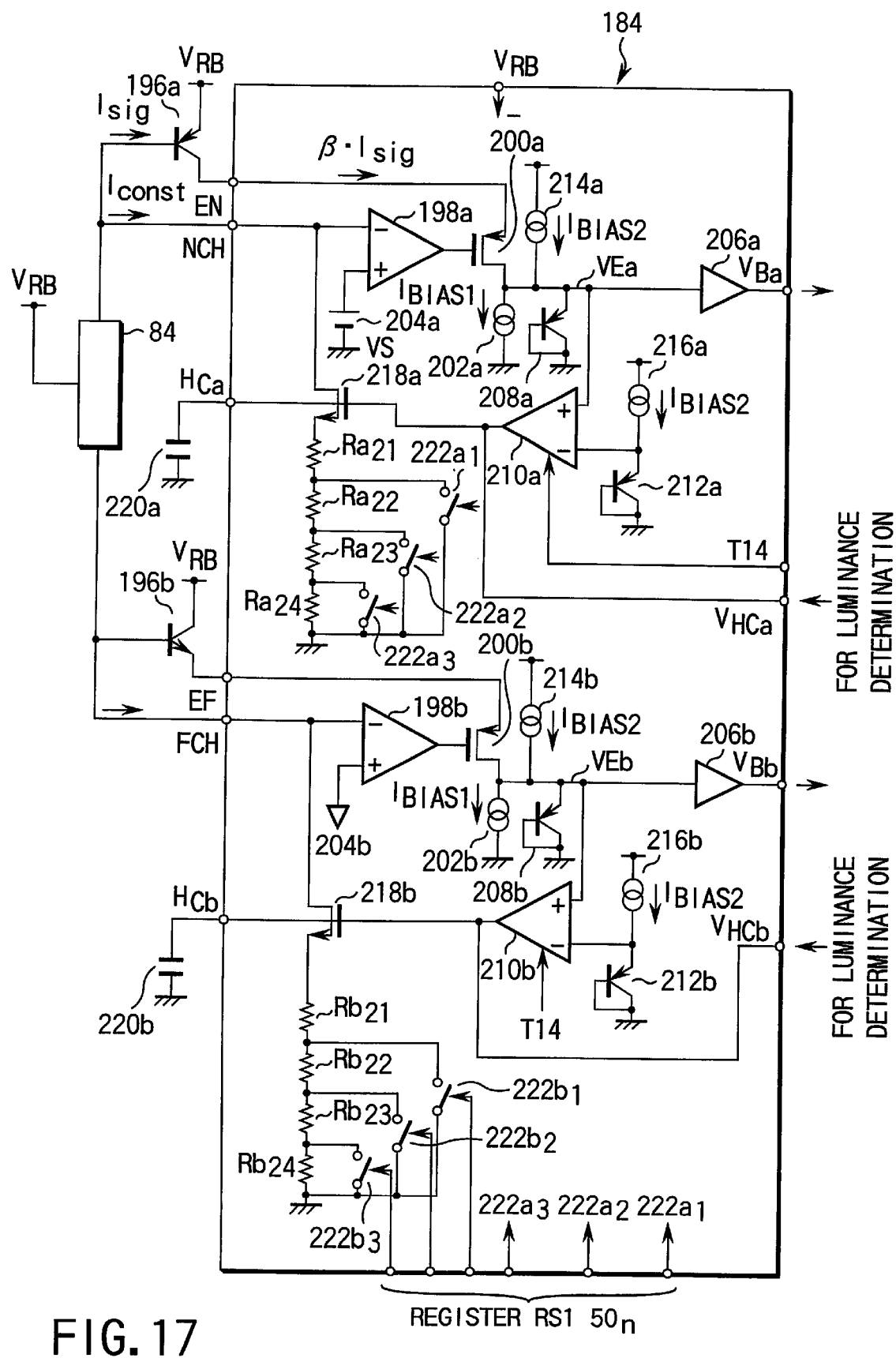
FIG. 17 shows a circuit diagram showing in detail a preamplifier circuit 184 shown in FIG. 16.

Referring to FIG. 17, the aforementioned preamplifier 184 will now be described.

Preamplifier circuits corresponding to the NCH terminal and FCH terminal of the PSD 84 have the same structure. Thus, a description will be given only to the NCH side, with character "b" in reference numerals being replaced with "a".

The power supply of the preamplifier 184 and remote control terminal of the PSD 84 are connected to the output $V_{RB}$ of the constant voltage circuit 192.

The preamplifier circuit 184 comprises a pair of amplifying NPN transistors 196a each receiving at the base a signal current from the NCH terminal of PSD 84 and outputting from the emitter a signal amplification current with a current amplification factor, an operational amplifier 198a, a PMOS transistor 200a, a current source 202a, a voltage source 204a, and a buffer 206a.

The preamplifier circuit 184 comprises a feedback section for equalizing the output terminal NCH voltage of the PSD 84 and the output voltage VS of the voltage source 204a, and a background light elimination section for eliminating a background light component included in the output signal of the PSD 84. The background light elimination section comprises a signal compression parasitic PNP transistor 208a with such a MOS structure that the signal amplification current is let to flow to an emitter and a logarithm compression signal is obtained from the emitter; an operational amplifier 210a; a reference potential PNP transistor 212a; a current source 214a; a current source 216a having a current value equal to the current source 214a; an NMOS transistor 218a; a hold capacitor 220a; resistors $Ra_{21}$–$Ra_{24}$ and switches $222a_1$–$222a_3$.

A PNP transistor, which is parasitically formed in a structure according to a general-purpose CMOS process, is used for the signal compression parasitic PNP transistor 208a. This PHP transistor, as shown in U.S. Pat. No. 5,557,363, is a vertical parasitic bipolar PNP transistor wherein a $P^+$ diffusion layer functions as an emitter, an N-well region as a base and P-type silicon substrate as a collector where a CMOS transistor is formed on a P-type silicon substrate.

The operation of the NCH-side circuit of the preamplifier circuit 184 will now be described.

Before projecting light on an object for distance measurement, a background light elimination operation is performed by the background light elimination section. The operational amplifier 210a is turned on by a signal L of the T14 terminal of register (RS1) $50_1$. Thus, a feedback loop is constituted such that the potential of the non-inversion input of the operational amplifier 210a, to which the signal compression parasitic PNP transistor 208a is connected, is made equal to the potential of the inversion input serving as a reference potential produced by the current source 216a and PNP transistor 212a.

Accordingly, only a current equal to the current source 214a flows to the signal compression parasitic PNP transistor 208a. Of the output current of the PSD 84, only a current Iconst of a background light component is input to the drain of the NMOS transistor 218a and drained to the ground (GND) via the resistors $Ra_{21}$–$Ra_{24}$.

For example, where the potential of the non-inversion input terminal of the operational amplifier 210a is higher than the potential of the inversion input terminal thereof, the output of the operational amplifier 210a increases and more current is input to the drain of the NMOS transistor 218a. Thereby, the current flowing to the base of the current amplification transistor 196a decreases, and also the current coming out of the emitter decreases. Thus, the current flowing to the signal compression PNP transistor 208a decreases, the potential of the non-inversion input terminal of the operational amplifier 210a decreases, and the negative feedback operation is performed.

On the other hand, where the potential of the inversion input terminal of the operational amplifier 210a is higher than the potential of the non-inversion input terminal thereof, the operation reverse to the above is performed and the negative feedback operation is performed. In this way, the reverse bias voltage to the PSD 84 is controlled such that $V_{RB}$–$V_S$ is applied.

The following relationship is established between the base current $I_B$ and emitter current $I_E$ of the current amplification NPN transistor 196a:

$$I_E \approx \beta \cdot I_B \quad (8)$$

where $\beta$ is a current amplification factor of the current amplifying transistor and takes a value of about 50 to 200.

In the background light elimination operation, the current $I_{BIAS1}$ of the current source 202a flows to the current amplification NPN transistor 196a. The base current $I_B$ of the current amplification NPN transistor 196a in this case is expressed by $$I_B = I_{BIAS1}/\beta \quad (9)$$

If the current value of the current source 214a is $I_{BIAS1}$, the emitter potential $V_{Ea}$ of the signal compression parasitic PNP transistor 208a is given by $$V_{Ea} = VT \cdot \ln(I_{BIAS2}/Is) \quad (10)$$

(VT: thermal voltage, Is: reverse saturation current)

The switches $222a_1$ to $222a_3$ are controlled by the register $50_1$ on the basis of the hold resistance of the resistors $Ra_{21}$–$Ra_{24}$. Where the value of the hold resistance is Rh, the upper limit value of the output voltage of the operational amplifier is Vh and the gate-source voltage of the NMOS transistor 218a is Vt1, the maximum value of the background light component which can be eliminated is given by $$I_{const}tmax = (Vh - Vt1)/Rh \quad (11)$$

By setting the hold resistance at a small value, a greater background light component can be eliminated. There is an advantage that the distance measuring operation can be performed with a higher luminance.

On the other hand, if the hold resistance Rh is decreased, the output impedance of the NMOS transistor 218a is decreased. Thus, there is a disadvantage that portion of the signal component is input to the drain of the NMOS transistor 218a and an error will occur in distance measurement.

Under the circumstances, the luminance is determined and the resistance value of the hold resistor Rh can be switched. Thereby, distance measurement with high luminance can be performed, while the distance measurement precision is not deteriorated. Specifically, the output of the luminance determination circuit is referred to, and a control is made such that the hold resistance Rh decreases as the luminance value increases.

The signal detection operation will now be described.

In the register (RS1) $50_1$, the T14 terminal signal is set at "H", and the operational amplifier 210a is turned off. Light is projected from the IRED 82 onto the object for distance measurement. Reflection light from the object is received by the PSD 84. In this way, the signal detection operation is performed. Since the operational amplifier 210a is turned off, the feedback loop for the background light elimination is cut off, and the gate potential of the NMOS transistor 218a is retained by the hold capacitor 220a. Thus, the value of the current flowing to the drain of the NMOS transistor 218a is unchanged, and the current $I_{const}$ of the background light component is continuously taken in.

Accordingly, all signal component current $I_{sig}$ output from the PSD 84 flows to the base of the current amplifying NPN transistors 196a.

Consequently, the base current of the current amplifying NPN transistors 196a in the signal detection operation increases by a degree corresponding to the signal component current $I_{sig}$. Since the signal component current $I_{sig}$ is amplified in the current amplifying NPN transistors 196a, the emitter current is increased by a degree corresponding to $\beta \cdot I_{sig}$. The added current $\beta \cdot I_{sig}$ flows to the source of the PMOS transistor 200a and further to the emitter of the signal compression parasitic PNP transistor 208a. Accordingly, the emitter potential $V_{Ea}$ of the signal compression parasitic PNP transistor 208a increases by a degree corresponding to the logarithm compression of the signal component current $\beta a \cdot I_{sig}$.

$$V_{Ea} = VT \cdot \ln((\beta a \cdot I_{siga} + I_{BIAS2})/Is) \approx VT \cdot \ln(\beta a \cdot I_{siga}/Is) \quad (12)$$

$$(\beta a \cdot I_{siga} >> I_{BIAS2})$$

If the signal current output to the FCH side is $I\beta b \cdot I_{sigb}$, the output $V_{Eb}$ of the FCH-side signal compression PNP transistor 208a is given by $$V_{Eb}=VT\cdot\ln((\beta b\cdot I_{sigb}+I_{BIAS2})/Is)\approx VT\cdot\ln(\beta b\cdot I_{sigb}/Is) \quad (13)$$

$$(\beta b\cdot I_{sigb}>>I_{BIAS2})$$

The emitter potentials $V_{Ea\,1\,and\,VEb}$ of the NCH-side and FCH-side signal compression PNP transistors 208a and 208b are input to the distance measurement arithmetic circuit 186 from the outputs $V_{Ba}$ and $V_{Bb}$ via the buffers 206a and 206b, while the emitter potentials $V_{Ea}$ and $V_{Eb}$ are being equalized.

Figure 18:
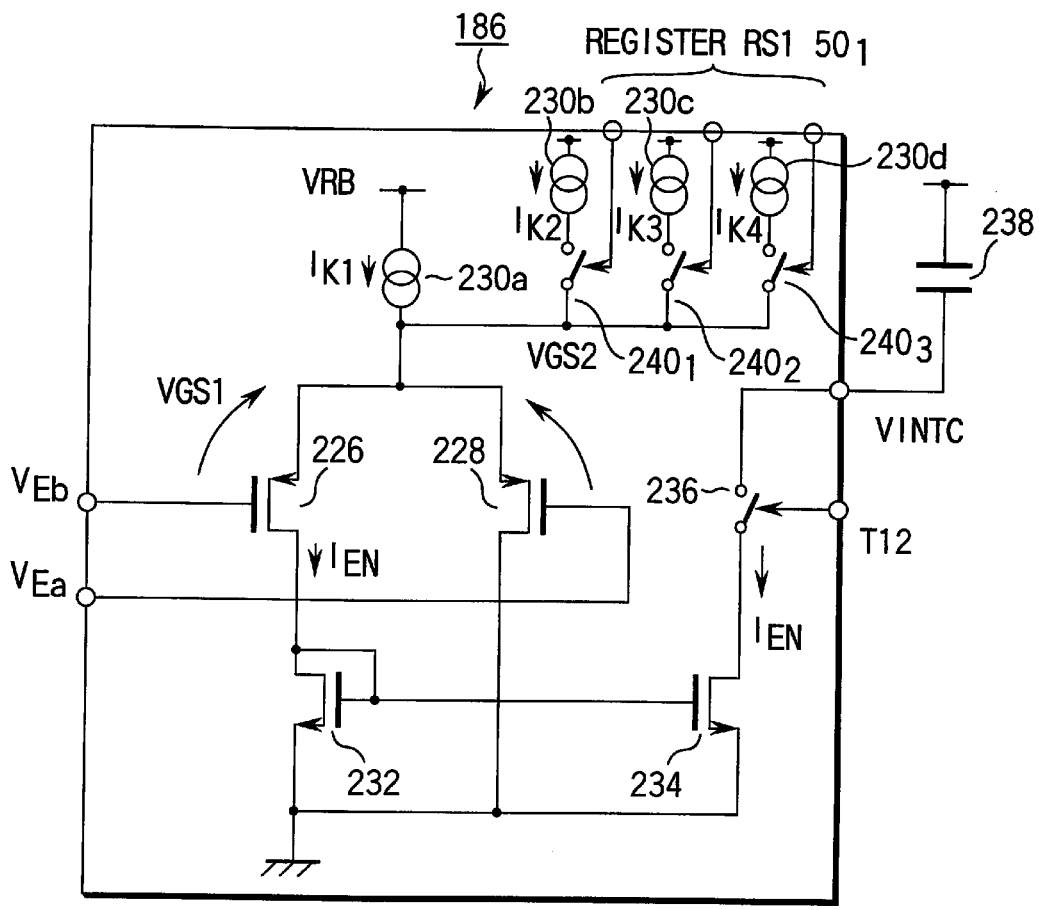
FIG. 18 shows a circuit diagram showing in detail a distance measurement arithmetic circuit 186 shown in FIG. 16.

Referring to FIG. 18, the distance measurement arithmetic circuit 186 will now be described.

The distance measurement arithmetic circuit 186 includes PMOS transistors 226 and 228 constituting a differential pair, and current sources 230a to 230d for biasing the differential pair. A current mirror is thus constituted for a drain current of the PMOS transistor 226. The distance measurement arithmetic circuit 186 also includes NMOS transistors 232 and 234 for outputting as a drain current of the NMOS transistor 234 a distance measurement arithmetic current output $I_{EN}$ which is equal to this drain current. The drain of the NMOS transistor 234 is connected to an integration capacitor 238 via a MOS switch 236.

The current sources 230a to 230d can alter a bias current to the differential pair by means of switches $240_1$ to $240_3$ controlled by the microcomputer 34 through the register $50_1$.

Figure 19:
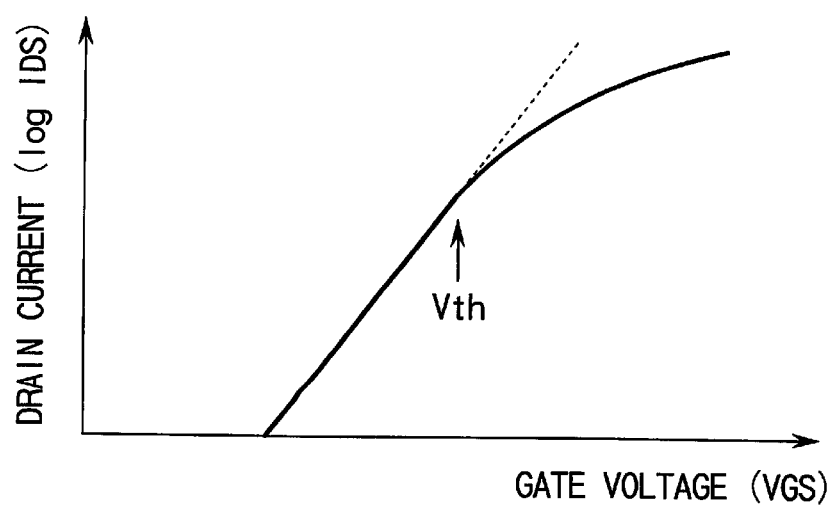
FIG. 19 is a graph showing VGS-ID characteristics of a MOS transistor.

The differential pair of the PMOS transistors 226 and 228 is biased with a relatively weak constant current, $1_{K1}$ to $1_{K4}$, so that the differential pair may operate in a sub-threshold region. The sub-threshold region is an operational region in a case where a MOS transistor is operated with a gate voltage of the MOS transistor being set in a weak inverted state of not greater than a threshold voltage Vth. It is known that the VGS-ID characteristics of the MOS transistor are similar to VBE-IC characteristics of a bipolar transistor (see FIG. 19).

Accordingly, the relationship between the gate-source voltage VGS and drain current IDS may be simplified as follows:

$$VGS=VT\cdot\ln(IDS) \quad (14)$$

The outputs $V_{Ba}$ and $V_{Bb}$ of the buffers 206a and 206b of the preamplifier 184 are input to the gates of the PMOS transistors 226 and 228 with the differential configuration. Since the outputs of the buffers are $V_{Ea}$ (=$V_{Ba}$) and $V_{Eb}$ (=$V_{Bb}$), if the gate-source voltages of the PMOS transistors 226 and 228 are VGS1 and VGS2, respectively, the following equation is established:

$$VGS1+V_{Eb}=VGS2+V_{Ea} \quad (15)$$

Based on this relationship, the distance measurement arithmetic current $I_{EN}$ is given by $$VT\cdot\ln(I_{EN})+VT\cdot\ln(IF/IS)=VT\cdot\ln(IK-I_{EN})+VT\cdot\ln(IN/IS) \quad (16)$$

(where IN=$\beta a\cdot I_{siga}$, IF=$\beta b\cdot I_{sigb}$)

$$I_{EN}=(IN/(IN+IF))\cdot I_K \quad (17)$$

The MOS switch 236 is turned on at the time of light projection and turned off when light is not projected. Each time a light projection operation is effected, the distance measurement arithmetic current $I_{EN}$ is integrated in the integration capacitor 238. It is publicly known that the distance measurement arithmetic current IEN exhibits characteristics associated with an inverse number 1/a of the subject distance a.

From equation (17), the constant current $I_K$ can be altered by the microcomputer 34 via the register $50_1$. Accordingly, the distance measurement arithmetic current $I_{EN}$ can be amplified with a gain, and high-precision distance measurement can be achieved for a weak output.

Figure 20:
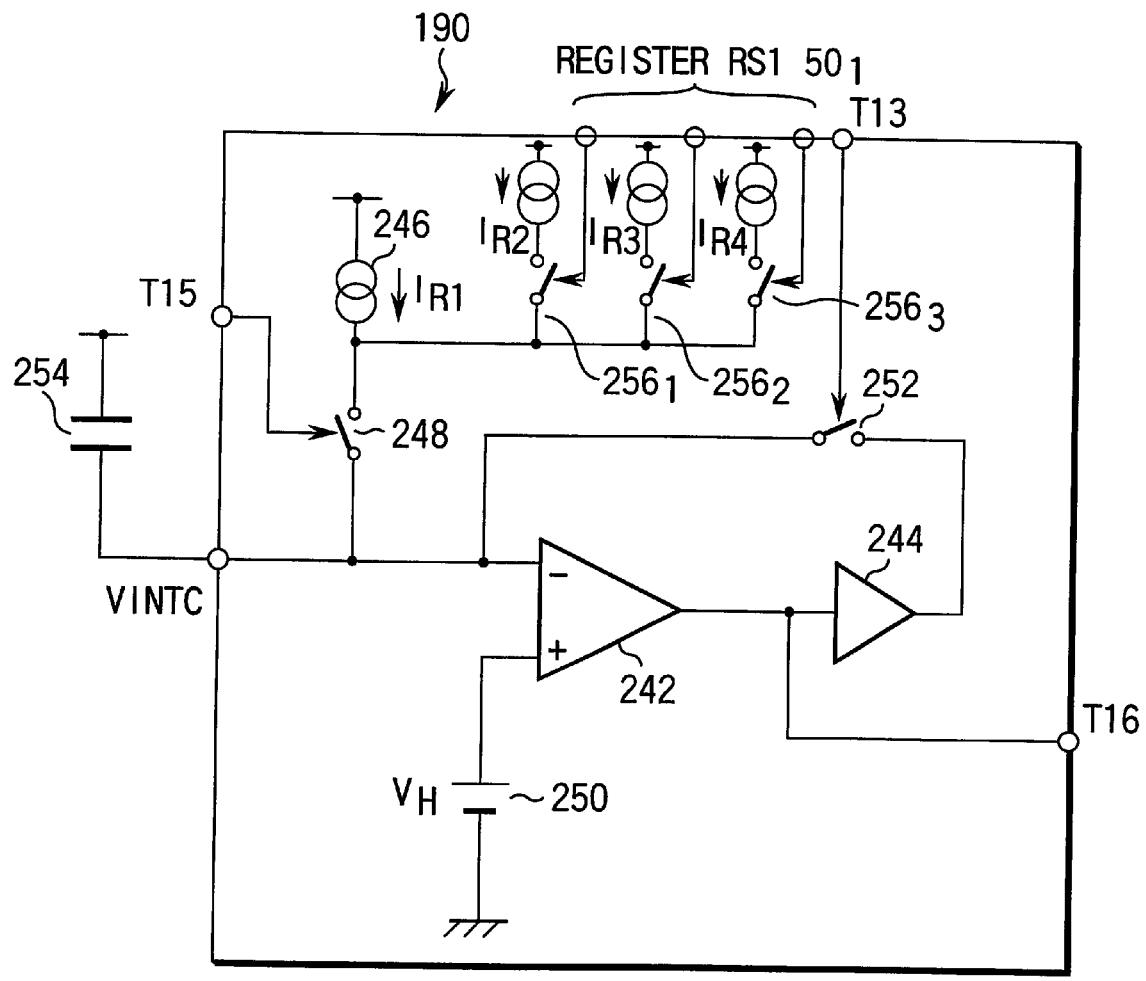
FIG. 20, is a circuit diagram showing in detail an integration reset/inverse integration circuit 190.

FIG. 20 is a circuit diagram showing in detail the integration reset/inverse integration circuit 190.

The integration reset/inverse integration circuit 190 comprises an operational amplifier 242, a buffer 244, an inverse integration circuit 246 with current sources 246a to 246d of constant currents $I_{R1}$–$I_{R4}$, a MOS switch 248 for permitting/prohibiting inverse integration, a reference voltage circuit 250, and a MOS switch 252 for effecting switching between an operational amplifier and a comparator.

The MOS switch 248 is controlled by the control terminal T15 of microcomputer 34. Before a series of light projection control steps is performed, the output from the control terminal T15 is at "L" level and the MOS switch 252 is in the off-state. The MOS switch 252, too, is controlled by a control terminal T13 of microcomputer 34 and set in the on-state. Accordingly, a so-called voltage follower comprising the operational amplifier 242 and buffer 244 performs a negative feedback operation. Thus, an integration capacitor 254 is fixed at a constant voltage $V_H$, which is an output from the reference voltage circuit 250, and is reset.

If the series of light projection operation is started, the T13 terminal is set at "L" level, the MOS transistor switch 252 is turned off and the feedback loop is cut off. Thus, the operational amplifier 242 operates as a comparator using $V_H$ as a determination voltage. Then, the series of light projection steps is completed, and the distance measurement arithmetic output is integrated in the integration capacitor 254.

In the microcomputer 34, the signal at the T15 terminal is changed from "L" to "H". Thereby, the MOS switch 248 is turned on, an inverse integration with the constant current $I_R$ is started, and the microcomputer 34 starts counting. With the passing of time from the start of the inverse integration, the potential of the integration capacitor 254 rises beyond the potential VH of the non-inversion input terminal of the operational amplifier 242. As a result, the output of the operational amplifier functioning as the comparator changes to "L". The output of the operational amplifier 242 is connected to the T16 terminal of microcomputer 34.

The microcomputer 34 counts the time (inverse integration time) during which the inverse integration is initiated and the potential of the T16 terminal changes from "H" to "L". Thereby, the A/D conversion of the distance measurement arithmetic output is executed and data on the inverse number 1/a of the subject distance a is acquired.

Where the inverse integration time is TR, the number of light projection (integration) operations is N and the time for a single integration operation is Ti, the following equation (18) is established from the aforementioned (distance measurement arithmetic) integration current $I_{EN}$ and inverse integration current $I_R$:

$$TR=I_{EN}\cdot N\cdot Ti/I_R \quad (18)$$

The value of the inverse integration current $I_R$ can be altered if switches 2561 to 2563 are controlled by the microcomputer 34 via the register (RS1) $50_1$.

Accordingly, by altering the inverse integration current $I_R$, amplification with a gain can be performed for the inverse integration time TR, and high-precision distance measurement can be achieved for a weak output. Even where the number N of light projection operations or the time Ti for a single integration operation is to be altered, the dynamic range in the inverse integration time TR can be properly adjusted.

The booster circuit 62 will now be described.

The booster circuit 62, as shown in FIG. 3 or FIG. 16, includes booster circuit 62 itself provided within the controller 30 and formed by the CMOS process, as well as an inductor L, a transistor Trd, a diode D, capacitors Cd1 and Cd2 and a resistor Rd of the external booster circuit 78.

The booster circuit section is controlled by the microcomputer 34 via the register 501, and turns on/off the boosting operation of the control signal T19 between "H" and "L". In addition, the booster circuit 62 switches a control signal T20 to a boosted voltage $V_{DD2}/V_{DD1}$ between "H" and "L". In this case, $V_{DD2}<V_{DD1}$.

Figure 21:
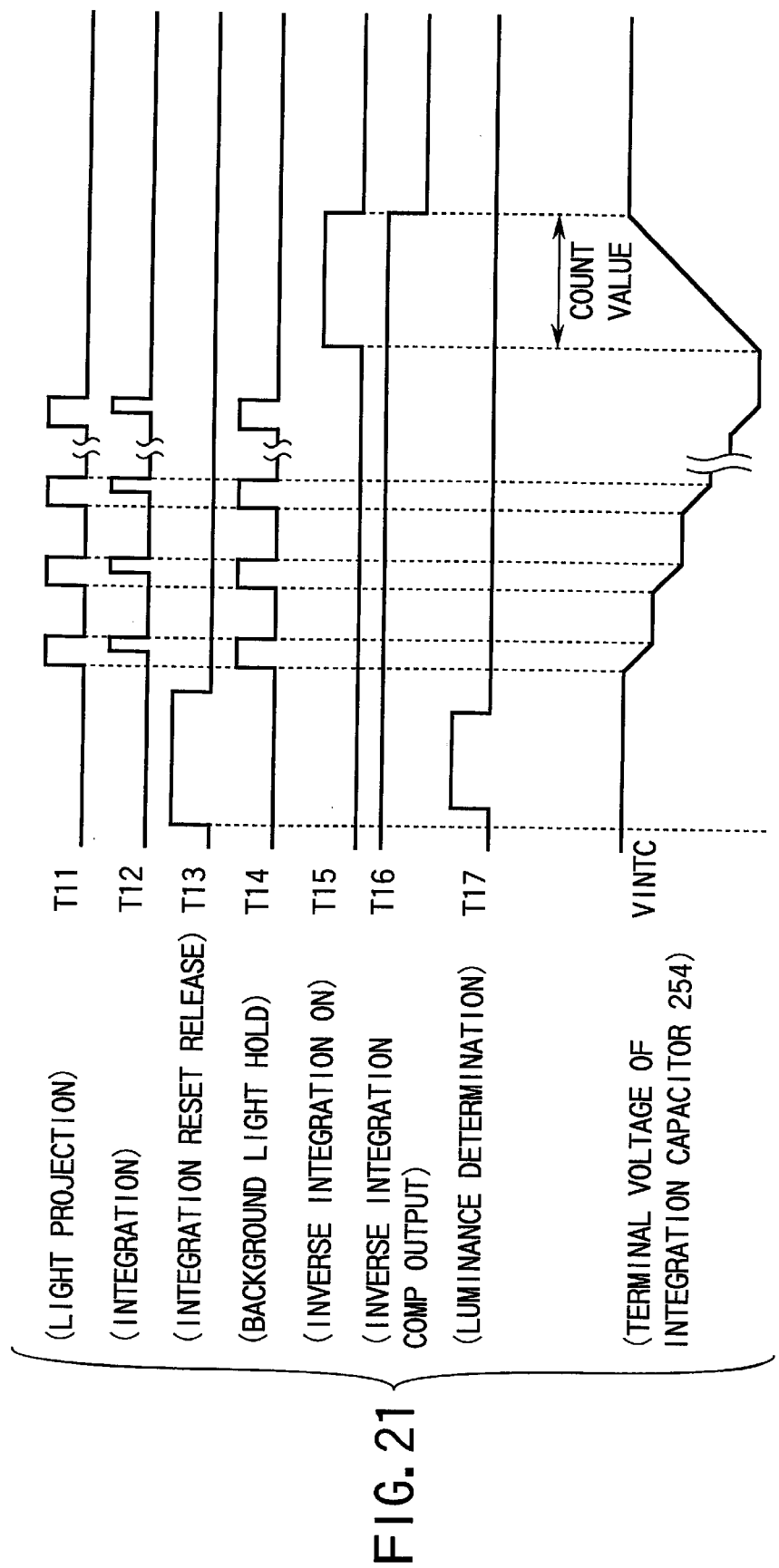
FIG. 21 is a timing chart showing the operations of the microcomputer 34, distance measuring circuit 56, etc.
Figure 22:
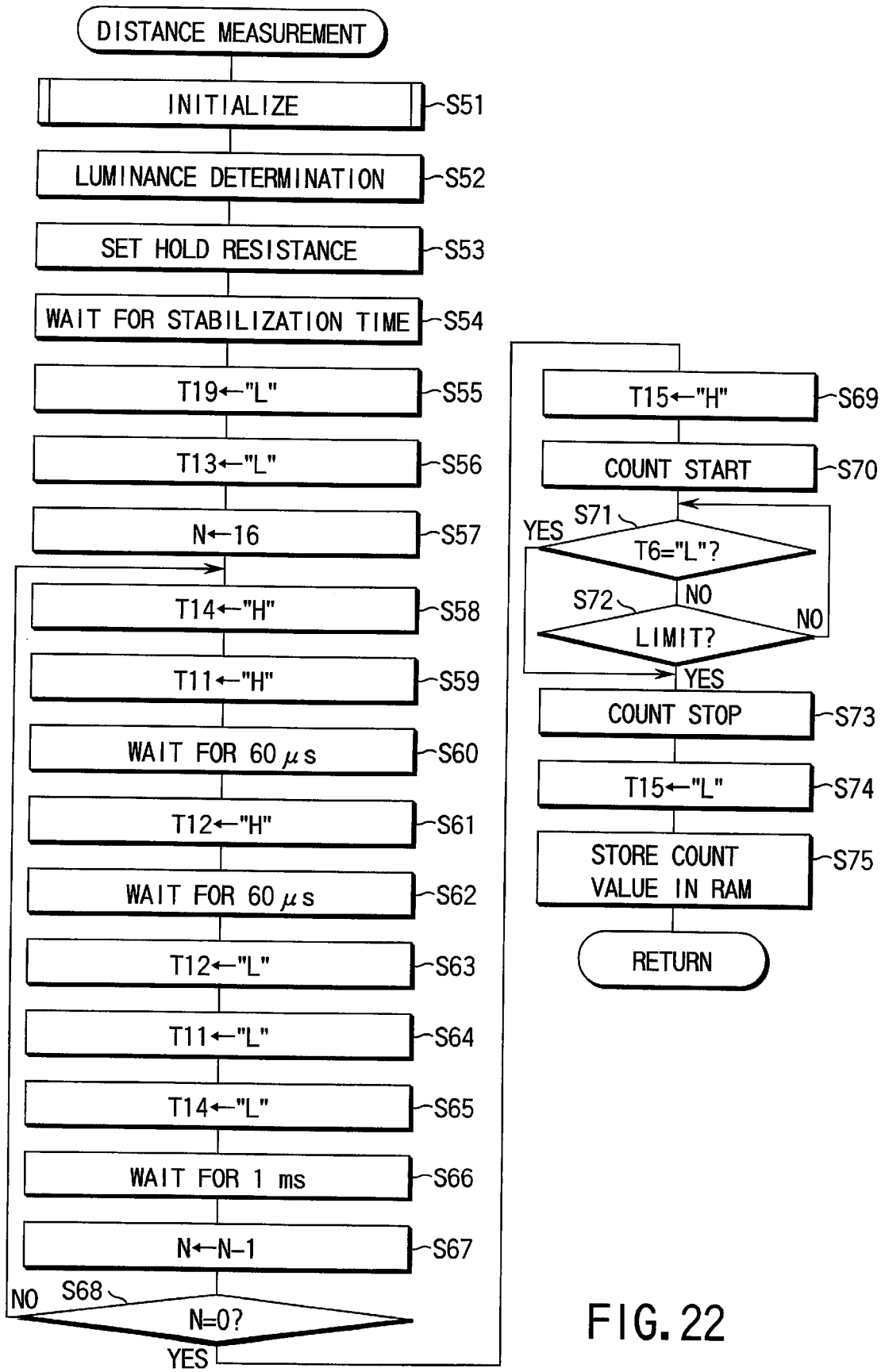
FIG. 22 is a flow chart illustrating the operation of the microcomputer for realizing the timing chart of FIG. 21.

FIG. 21 is a timing chart showing the operations of the microcomputer 34, distance measuring circuit 56, etc. FIG. 22 is a flow chart illustrating the operation of the microcomputer 34 for realizing the timing chart of FIG. 21.

The operations of the microcomputer 34 will now be described with reference to the timing chart of FIG. 21 and the flow chart of FIG. 22.

In step S51, the respective terminals are initialized. Terminals T13 and T19 are set at "H", and T11, T12, T14 and T15 are set at "L". At this time, the initial value of the hold resistance Rh, the bias current value $I_K$ of distance measuring arithmetic circuit 186 and the inverse integration current value of integration reset/inverse integration circuit 190 are set on the basis of the data in the EEPROM 70. Further, the integration capacitor 254 is reset by the signal "H" at the terminal T13 of microcomputer 34, and at the same time the background light elimination operation is performed.

In step S52, the microcomputer 34 refers to the output T17 of luminance determination circuit 188 with a predetermined timing in the background light hold state. In step S53, the control signal is set in accordance with the luminance and the resistance value of the hold resistance Rh is set.

In step S54, a wait time for a predetermined stabilization time is counted. In step S55, the microcomputer 34 changes the output T19 from "H" to "L" and stops the operation of the booster circuit 62. Thereby, a ripple of the power supply voltage $V_{DD}$, which occurs at the time of operation of the booster circuit 62, is prevented from adversely affecting the distance measuring circuit 56 as noise and deteriorating the distance measurement precision.

In step S56, the signal at the T13 terminal of microcomputer 34 is changed from "H" to "L", and the integration reset is released. Thereby, the distance measuring arithmetic output can be integrated by the integration capacitor 254.

In step S57, the number of light projection operations, N, is set at 16. In step S58, the microcomputer 34 changes the signal of the output T14 from "L" to "H", and the background light hold state is set.

In step S59, the microcomputer 34 changes the signal of the output T11 from "L" to "H", and the IRED 82 is caused to emit light. If the control stands by for 60 µsec in step S60, the signal at the output T12 is changed from "L" to "H" in step S61 and the integration state is set. In step S62, the distance measurement arithmetic output $I_{EN}$ is integrated in the integration capacitor 254 only while the signal at the output T12 is at "H" level (60 µsec).

In step S63, the signal at the output T13 is changed from "H" to "L", and the integration operation is stopped. In step S64, the output T11 is set at "L" and the light projection is stopped. Further, in step S65, the output T14 is set at "L" and the background light hold state is released. Thereby, a feedback loop for bypassing the background light current is formed, and the background light current continues to be eliminated, following a variance in background light.

In step S66, after waiting for 1 msec, the number N is decremented in step S67.

In step S68, it is determined whether the number N becomes zero. If the number of light projection operations is not zero, the control goes to step S58. If N=0, the control goes to step S69.

In step S69, the signal at the output T15 is changed from "L" to "H", and the inverse integration operation is started. At the same time, in step S70, the microcomputer 34 starts the counting operation in the internal counter.

In step S71, it is determined whether the signal at the output T16 is "L" or not. If the signal is not "L", the control goes to step S72 and it is determined whether the count value has exceeded a counter limit.

In steps S71 and S72, if the potential at the output T16 is "L" or the count value has exceeded the counter limit, the counting is stopped in step S73. Then, in step S74, the signal at the output T15 is set at "L" and the inverse integration operation is stopped.

In step S75, the counter is stopped, and the count value representing the distance measurement data is stored in the RAM 40.

The series of distance measuring steps is completed, as described above, and the distance measurement arithmetic (comparative arithmetic) result is stored in the RAM 40.

A second embodiment of the present invention will now be described.

In the second embodiment, the remote control reception circuit is also used for another function, thereby achieving cost reduction.

Recently, a communication system according to the IrDA standard stipulated by the IrDA (Infrared Data Association), which is an organization for standardizing the infrared communication system, has begun to be used in digital cameras, etc.

Specifically, where data communication is to be performed between a camera and an external device with use of IrDA (optical communication), if a circuit for exclusive use in IrDA is provided, the cost increases. Thus, such a circuit cannot be used in a low-price camera. In this embodiment, a remote control reception circuit is also used as a reception circuit for IrDA.

Figure 23:
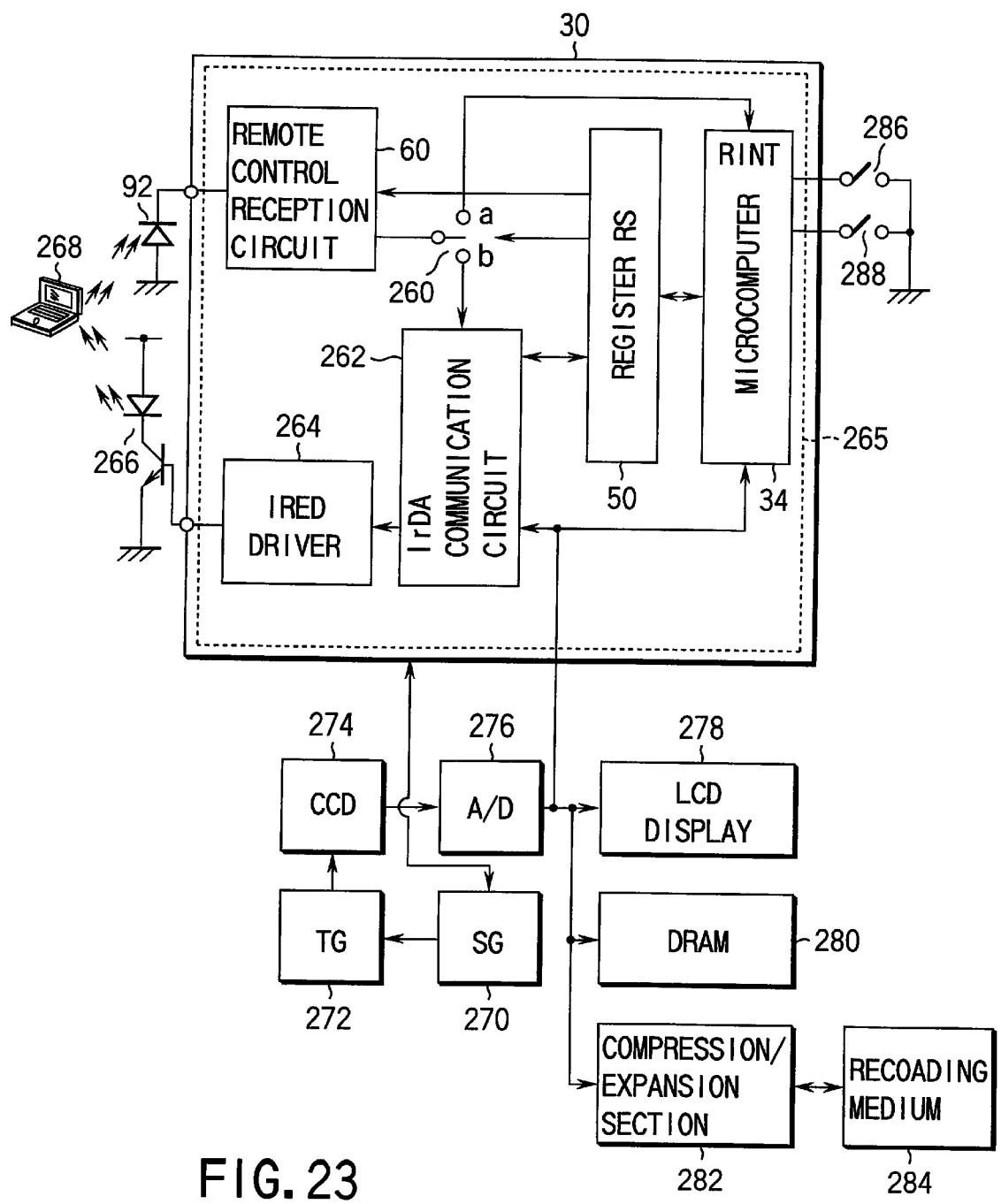
FIG. 23 is a block diagram showing a second embodiment of the present invention.

FIG. 23 is a block diagram showing the second embodiment of the present invention.

In the second embodiment, a camera controller is applied to a digital camera. The camera is constructed to have a remote control reception function and an IrDA communication function.

A camera controller 30 is constructed by a CMOS process. The camera controller 30 comprises a microcomputer 34, a register group 50, a remote control reception circuit 60, a MOS switch 260, an IrDA communication circuit 262 and an IRED driver 264. These elements are formed on a single IC 265 as a one chip.

An output from the IRED driver 264 is supplied to an external IRED 266. Light is emitted from the IRED 266 to an external device 268 such as a personal computer.

A signal generator (SG) 270 is connected to the camera controller 30. The signal generator 270 establishes synchronism between the microcomputer 34 and a timing generator (TG) 272. An output from the signal generator 270 is supplied to a CCD 274 via the timing generator 272.

An output from the CCD 274 is supplied via an A/D converter 276 to an LCD display 278, a DRAM 280, a compression/expansion section 282 and the camera controller 30. The compression/expansion section 282 performs data exchange with a recording medium 284.

A REC mode switch (SW) 286 band a PLAY mode switch 288 are connected to the microcomputer 34.

If a REC (recording) mode is set by the REC mode switch 286, a release switch operation (not illustrated) is performed and the CCD 274 is exposed by a control signal from the timing generator 272. The CCD 274 outputs an image signal. The image output from the CCD 274 is A/D converted by the A/D converter 276, and the converted data is stored in the DRAM 280.

The image data stored in the DRAM 280 is compressed by the compression/expansion section 282 and converted to a format which permits recording on the recording medium 284. The converted data is recorded on the recording medium 284.

On the other hand, if a PLAY (reproducing) mode is set by the PLAY mode switch 286, the microcomputer 34 turns on the IrDA communication circuit 262 and remote control reception circuit 60 and the MOS switch 260 is turned to the b-side terminal.

The remote control reception circuit data for IrDA communication, which is stored in the EEPROM 70, is set in the remote control reception circuit 60 via the register group 50.

The image data recorded in the recording medium 284 is expanded by the compression/expansion section 282 and displayed on the LCD display 278. Besides, in order to transmit the image data to the external device 268, the image data is sent to the IrDA communication circuit 262.

The microcomputer 34 sends a communication command to the IrDA communication circuit 262. According to the communication command, the IrDA communication circuit 262 causes the IRED driver 264 to drive the IRED 266. The image data is superimposed on infrared light, and the resultant light is sent to the external device 268.

On the other hand, the communication infrared light from the external device 268 is made incident on a remote control photodiode 92 and input to the remote control reception circuit 60. Since the IrDA-matched data (the gain of the preamplifier, central frequency $f_0$ of the BPF, frequency selection ratio Q, threshold level of the waveform shaping circuit, etc.) is set in the remote control reception circuit 60, the IrDA communication infrared light is detected here and waveform-shaped. Then, the light is input to the IrDA communication circuit 262. In the IrDA communication circuit 262, the communication infrared signal is decoded and the decoded result is sent to the microcomputer 34.

In this way, communication between the camera controller 30 and external device 268 is effected.

Figure 24:
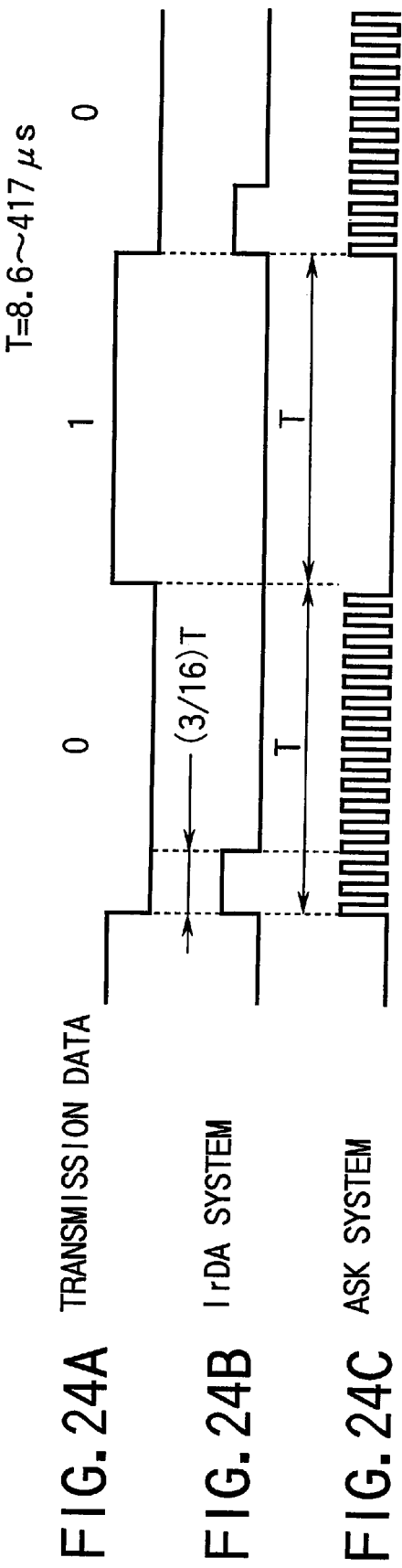
FIGS. 24A to 24C show waveforms relating to different communication formats for transmission data.

Assuming that the transmission data has a waveform as shown in FIG. 24A, the communication format for IrDA is of the type in which the carrier (carrier wave) is not modulated, as shown in FIG. 24B. Compared to the case of remote control signal reception, the frequency selection ratio Q needs to be decreased. Since the distance to which the signal can reach is specified to be about 1m, the gain of the preamplifier may be adjusted accordingly.

An ASK system, as shown in FIG. 24C, is generally employed as communication format. In this case, the carrier frequency is 500 kHz and much higher than the carrier frequency of 25 to 40 kHz of an ordinary remote control apparatus.

In the case of the ASk system, another mode switch may be provided for switchable operations. If this mode is set, the central frequency of the BPF is set at 500 kHz. Thus, the pre-adjusted data stored in the EEPROM is set in the BPF.

The IRED 266 and IRED driver 264 may be replaced with the IRED 82 and distance measuring circuit 56 in the first embodiment. In this case, there is no need to provide the IRED 266 and IRED driver 264, and the manufacturing cost can be further reduced.

As described above, without newly adding a light reception element or a light reception circuit, the characteristics of the remote control reception circuit are made variable, and thus the IrDA communication function can be added. Therefore, an increase in cost can be prevented.

A third embodiment of the present invention can be described.

Figure 25:
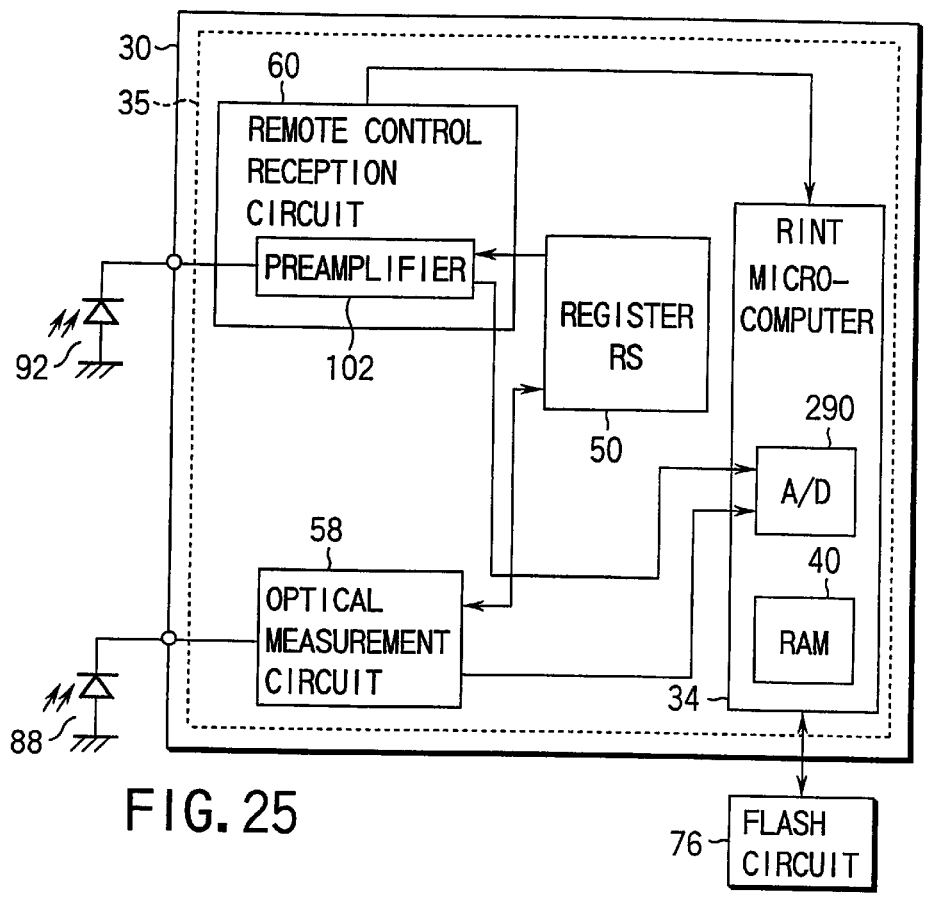
FIG. 25 is a block diagram showing a third embodiment according to the present invention.

FIG. 25 is a block diagram showing the third embodiment according to the present invention.

In general photographing, where a subject is illuminated with artificial light, for example, where a subject is illuminated by a fluorescent lamp, green on a photograph becomes stronger and a color balance becomes unnatural. If an artificial light source is determined, a control is performed to emit flash light by means of the flash circuit 76 at the time of exposure, thereby correcting the color balance.

In this case, the artificial light source is generally determined by finding a ratio between a visible light component and an infrared component.

The controller 30 is constructed by a CMOS process. A microcomputer 34, a register (RS) 50, an optical measuring circuit 58 and a remote control reception circuit 60 are formed on a single IC as one chip.

A photodiode 92 is connected to an input of a preamplifier 102 in the remote control reception circuit 60.

Figure 26:
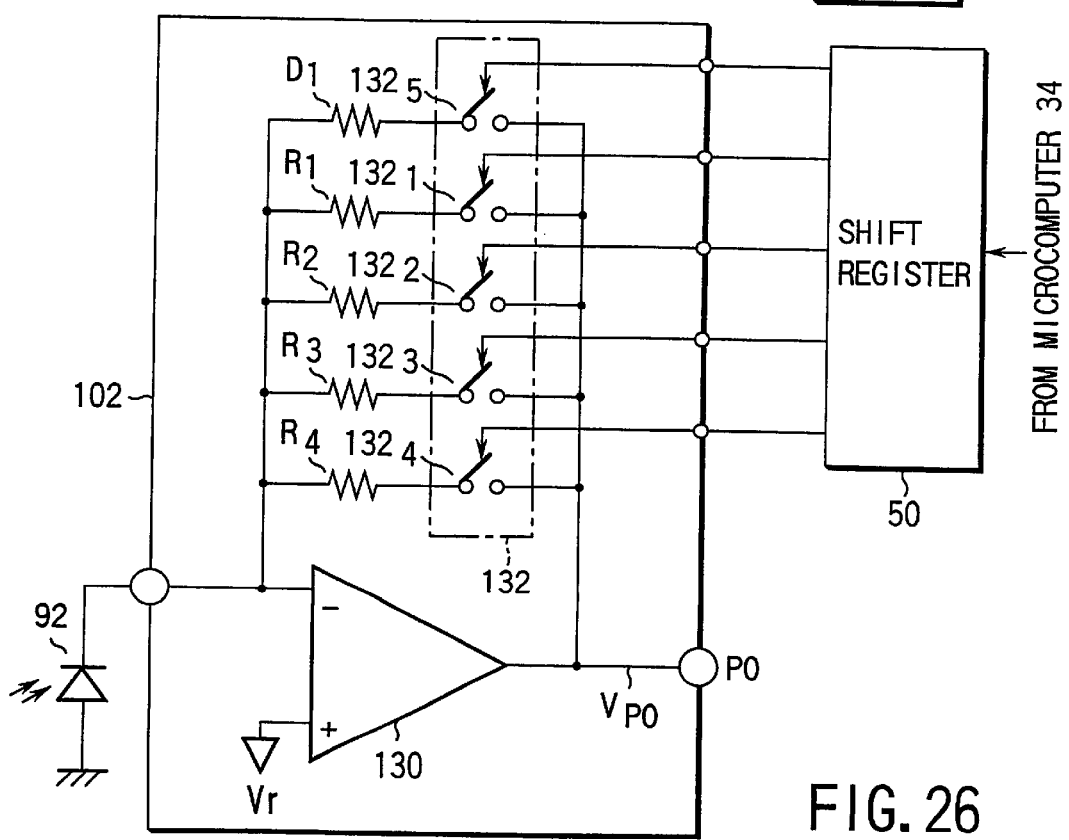
FIG. 26 is a circuit diagram showing in detail a preamplifier 102 shown in FIG. 25.

FIG. 26 is a circuit diagram showing in detail the preamplifier 102 shown in FIG. 25. Only different points from the structure of the first embodiment shown in FIG. 10 will be described.

An anode of a diode D1 is connected to an inversion input of an operational amplifier 130, and a cathode thereof is connected to an output of the operational amplifier 130 via a switch $132_5$.

The optical measuring circuit 58 outputs a signal relating to visible light, and the remote control reception circuit 60 outputs a signal relating to remote control and infrared. When a signal relating to remote control is output, the switch $132_5$ is turned off and the switches $132_1$ to $132_4$ are turned on. On the other hand, when a signal relating to infrared is output, the switch $132_5$ is turned on and the switches $132_1$ to $132_4$ are turned off.

In the remote control mode, the microcomputer 34 controls the register 50 to turn on the switches $132_1$ to $132_4$. The operation in the remote control mode is the same as in the first embodiment, and so a description thereof is omitted.

On the other hand, in the infrared light measurement mode, the microcomputer 34 controls the register 50 to turn on the switch $132_5$. Optical current from the photodiode 92 is logarithm-compressed and converted to a voltage, and the resultant voltage is output from an output terminal of the operational amplifier 130. The output from the operational amplifier 130 is A/D converted by an A/D converter 290 built in the microcomputer 34, and the converted result is stored in the RAM 40 and the infrared component is measured.

Similarly, the output from the optical measuring circuit 58 is A/D converted. A visible light measurement value and an infrared measurement value are compared, predetermined arithmetic operations are performed, and the type of a light source illuminating the subject is determined.

According to the third embodiment, the characteristics of the remote control reception circuit 60 are switched to perform infrared measurement. The characteristic switching circuit therefore is fabricated on the same IC chip 35 as the microcomputer 34. Thus, the artificial light can be detected without incurring an increase in cost.

As has been described above, according to the camera controller of the present invention, special advantages can be obtained. That is, the microcomputer and analog circuits can be fabricated on the IC board with low-cost CMOS structure and the analog circuit characteristics can be enhanced.

Moreover, without incurring an increase in cost, a variance in distance of reach of remote control signals is reduced. Specifically, remote control reception apparatuses with a short and varying distance of reach can be improved and the yield of manufacture can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera controller comprising:
a microcomputer;
a measuring circuit for a camera, the measuring circuit acquiring information necessary for an operation of the camera and having variable electrical characteristics; and
an alteration circuit, controlled by the microcomputer, for altering the electrical characteristics of the measuring circuit for the camera, the alteration circuit altering the electrical characteristics of the measuring circuit to adjust variances between the electrical characteristics of the measuring circuit and electrical characteristics of a measuring circuit of another camera controller,
wherein said microcomputer and said circuits of the camera controller are fabricated on a single semiconductor substrate.

2. A camera according to claim 1, further comprising a memory, wherein a setting constant for setting the characteristics of the measuring circuit, which are set by the alteration circuit, is stored in the memory.

3. A camera controller according to claim 1, wherein said measuring circuit for camera is a reception circuit for receiving a remote control signal, and said alteration circuit alters a setting constant of electrical characteristics of said reception circuit.

4. A camera controller according to claim 3, wherein the setting constant for setting the characteristics of the reception circuit, which are set by the alteration circuit, includes at least one of a detection frequency of the remote control signal and a circuit gain.

5. A camera controller according to claim 3, wherein said reception circuit includes an amplifier for amplifying the received remote control signal, and said setting constant is adjustment data relating to an amplification factor of the amplifier.

6. A camera controller according to claim 3, wherein said reception circuit includes a band-pass filter for passing a specific frequency component alone, and said setting constant is adjustment data relating to a central frequency of said specific frequency component.

7. A camera controller according to claim 3, wherein said reception circuit includes a band-pass filter for passing a specific frequency component alone, and said setting constant is adjustment data relating to a frequency selection ratio of said specific frequency component.

8. A camera controller comprising:
a microcomputer;
a measuring circuit for a camera, the measuring circuit acquiring information necessary for an operation of the camera and having variable electrical characteristics; and
an alteration circuit, controlled by the microcomputer, for altering the electrical characteristics of the measuring circuit for the camera,
wherein said microcomputer and said circuits are fabricated on a single semiconductor substrate,
wherein said measuring circuit for camera is a reception circuit for receiving a remote control signal, and said alteration circuit alters a setting constant of electrical characteristics of said reception circuit of said reception circuits, and
wherein said reception circuit includes a waveform shaping circuit for performing waveform-shaping in comparison with a predetermined threshold level, and said setting constant is adjustment data relating to said threshold level.

9. A camera controller according to claim 3, wherein said reception circuit serves also as a reception circuit for receiving optical communication data from an external device.

10. A camera controller according to claim 1, wherein said measuring circuit for camera is a distance measuring circuit for detecting a distance to a subject, and said alteration circuit alters a setting constant of electrical characteristics of said distance measuring circuit.

11. A camera controller according to claim 10, wherein said distance measuring circuit includes an amplifier for amplifying a light reception signal from the subject, and said setting constant is adjustment data relating to an amplification factor of the amplifier.

12. A camera controller according to claim 1, wherein said measuring circuit for camera is an optical measuring circuit for detecting a luminance of a subject, and said alteration circuit alters a setting constant of electrical characteristics of said optical measuring circuit.

13. A camera controller according to claim 1, wherein said measuring circuit for camera is a reception circuit for receiving optical communication data from an external device, and said alteration circuit alters a setting constant of electrical characteristics of said reception circuit.

14. A camera controller according to claim 13, wherein said reception circuit includes a band-pass filter for passing a specific frequency component alone, and said setting constant is adjustment data relating to a central frequency of said specific frequency component.

15. A camera controller according to claim 1, wherein said measuring circuit for camera is an optical measuring circuit for detecting a type of a light source illuminating a subject, and said alteration circuit alters a setting constant of electrical characteristics of said optical measuring circuit.

16. A camera controller comprising:
a microcomputer;
a measuring circuit for a camera, the measuring circuit acquiring information necessary for an operation of the camera and having variable electrical characteristics; and
an alteration circuit, controlled by the microcomputer, for altering the electrical characteristics of the measuring circuit for the camera, wherein said microcomputer and said circuits are fabricated on a single semiconductor substrate, wherein said measuring circuit for camera is an optical measuring circuit for detecting a type of a light source illuminating a subject, and said alteration circuit alters a setting constant of electrical characteristics of said optical measuring circuit, and wherein said optical measuring circuit includes a first optical measuring circuit for measuring visible light and a second optical measuring circuit for measuring infrared, and said microcomputer compares a visible light measurement value and an infrared measurement value which are output from the first and second optical measuring circuits, and determines the type of the light source illuminating the subject.

17. A camera controller according to claim 16, wherein said second optical measuring circuit serves also as a reception circuit for receiving a remote control signal, and said alteration circuit selectively switches a function of the second optical measuring circuit.

18. A camera controller according to claim 1, wherein said measuring circuit for camera is an analog circuit.

19. A camera wherein the camera controller according to claim 1 is mounted in said camera.

20. A camera controller comprising:
a microcomputer;
a measuring circuit for acquiring information necessary for an operation of a camera; and
an alteration circuit for altering electrical characteristics of the measuring circuit,
wherein said microcomputer and said circuits are fabricated on a common semiconductor substrate by one of a CMOS process and a BICMOS process, and the alteration circuit alters the electrical characteristics of the measuring circuit to adjust variances, produced by the process, between the electrical characteristics of the measuring circuit and electrical characteristics of a measuring circuit of another camera controller.

21. A camera according to claim 20, further comprising a non-volatile memory, wherein said alteration circuit performs alteration on the basis of an output from the non-volatile memory.

22. A camera controller comprising:
a digital circuit for controlling an operation of a camera;
a measuring circuit for acquiring information necessary for the operation of the camera; and
an alteration circuit for altering electrical characteristics of the measuring circuit,
wherein said circuits are fabricated on a common semiconductor substrate by one of a CMOS process and a BICMOS process, and the alteration circuit alters the electrical characteristics of the measuring circuit to adjust variances produced by the process between the electrical characteristics of the measuring circuit and electrical characteristics of a measuring circuit of another camera controller.

23. A camera controller according to claim 22, wherein said measuring circuit is a reception circuit for receiving a remote control signal, and said alteration circuit alters a setting constant of electrical characteristics of said reception circuit.

24. A camera controller according to claim 23, wherein the setting constant for setting the characteristics of the reception circuit, which are set by the alteration circuit, includes at least one of a detection frequency of the remote control signal and a circuit gain.

25. A camera controller according to claim 22, wherein said measuring circuit is a reception circuit for receiving optical communication data from an external device, and said alteration circuit alters a setting constant of electrical characteristics of said reception circuit.

26. A camera controller according to claim 22, wherein said measuring circuit is a distance measuring circuit for detecting a distance to a subject, and said alteration circuit alters a setting constant of electrical characteristics of said distance measuring circuit.

27. A camera controller according to claim 22, wherein said measuring circuit is an optical measuring circuit for detecting a type of a light source illuminating a subject, and said alteration circuit alters a setting constant of electrical characteristics of said optical measuring circuit.

28. A camera according to claim 22, further comprising a non-volatile memory, wherein said alteration circuit performs alteration on the basis of an output from the non-volatile memory.

29. A camera controller comprising:
a microcomputer;
an analog circuit for a camera; and
an alteration circuit for altering electrical characteristics of the analog circuit,
wherein said microcomputer and said circuits are fabricated on a common semiconductor substrate and the alteration circuit alters the electrical characteristics of the analog circuit to adjust variances between the electrical characteristics of the analog circuit and electrical characteristics of an analog circuit of another camera controller.

30. A camera controller according to claim 29, wherein said analog circuit for camera is a reception circuit for receiving a remote control signal, and said alteration circuit alters a setting constant of electrical characteristics of said reception circuit.

31. A camera controller according to claim 30, wherein the setting constant for setting the characteristics of the reception circuit, which are set by the alteration circuit, includes at least one of a detection frequency of the remote control signal and a circuit gain.

32. A camera controller according to claim 29, wherein said analog circuit for camera is a reception circuit for receiving optical communication data from an external device, and said alteration circuit alters a setting constant of electrical characteristics of said reception circuit.

33. A camera controller according to claim 29, wherein said analog circuit for camera is a distance measuring circuit for detecting a distance to a subject, and said alteration circuit alters a setting constant of electrical characteristics of said distance measuring circuit.

34. A camera controller according to claim 29, wherein said analog circuit for camera is an optical measuring circuit for detecting a type of a light source illuminating a subject, and said alteration circuit alters a setting constant of electrical characteristics of said optical measuring circuit.

35. A camera according to claim 29, further comprising a non-volatile memory, wherein said alteration circuit performs alteration on the basis of an output from the non-volatile memory.

36. A camera controller according to claim 29, wherein the camera controller is fabricated by a CMOS process.

37. A camera controller according to claim 29, wherein the camera controller is fabricated by a BICMOS process.

38. A camera according to claim 2, wherein the setting constant stored in memory is a calibration constant corresponding to the measuring circuit in the camera.

39. A camera according to claim 38, wherein the calibration constant is acquired adjustment data for optimizing an output of the measuring circuit in the camera.

40. A camera according to claim 39, wherein the calibration constant is determined and loaded during user operation of the camera.

41. A camera according to claim 39, wherein the calibration constant stored in memory has been determined and pre-loaded during the manufacturing process.

42. A camera according to claim 2, wherein the setting constant stored in memory is an adjustment constant corresponding to measuring circuit fabrication variations.

43. A camera according to claim 42, wherein the setting constant stored in memory has been determined and pre-loaded during the manufacturing process.

* * * * *